(12) United States Patent
Dearing

(10) Patent No.: US 12,051,034 B2
(45) Date of Patent: *Jul. 30, 2024

(54) USE OF GEOSPATIAL COORDINATE SYSTEMS FOR TRACKING ITEM DELIVERY

(71) Applicant: United States Postal Service, Washington, DC (US)

(72) Inventor: Stephen M. Dearing, Herndon, VA (US)

(73) Assignee: United States Postal Service, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/804,670

(22) Filed: May 31, 2022

(65) Prior Publication Data
US 2022/0292452 A1    Sep. 15, 2022

Related U.S. Application Data

(62) Division of application No. 16/154,564, filed on Oct. 8, 2018, now Pat. No. 11,361,273.

(Continued)

(51) Int. Cl.
G06Q 10/0833  (2023.01)
G06F 16/29    (2019.01)
H04W 4/021    (2018.01)

(52) U.S. Cl.
CPC ......... *G06Q 10/0833* (2013.01); *G06F 16/29* (2019.01); *H04W 4/021* (2013.01)

(58) Field of Classification Search
CPC .... G06Q 10/0833; G06F 16/29; H04W 4/021
(Continued)

(56) References Cited

U.S. PATENT DOCUMENTS 9,743,239 B1 *  8/2017  Mishra ............... H04W 4/023
10,926,777 B2 * 2/2021  McGill ............. B60W 50/0097
(Continued)

FOREIGN PATENT DOCUMENTS

EP            2851846 A2    3/2015
WO    WO 2008/047117 A2    4/2008

OTHER PUBLICATIONS

"How to Choose "Last Mile" Delivery Modes for E-Fulfillment" Published by Hindawi Publishing Corporation (Year: 2014).*

(Continued)

*Primary Examiner* — Zeina Elchanti
(74) *Attorney, Agent, or Firm* — Knobbe, Martens, Olson & Bear, LLP

(57) ABSTRACT

A system and method for accurately tracking the delivery of items in an item distribution network using a purpose built confidence event recorder. An item sorter sorts items for delivery based upon route information and preferences for the delivery. Items are tracked while out for delivery through the use of confidence data recorded by a confidence event recorder carried by an item carrier. The confidence data recorder can that can record GPS and time data, as well as scan barcodes, such as a barcode on an item to be delivered. Confidence data can be used to accurately record when and where item carriers deliver items. The system determines if an actual delivery occurred by comparing the confidence data to previously gathered confidence data. An expected delivery window generation system can be used to generate expected delivery windows for the delivery of new items based on the confidence data recorded.

20 Claims, 8 Drawing Sheets

Related U.S. Application Data

(60) Provisional application No. 62/569,729, filed on Oct. 9, 2017.

(58) Field of Classification Search
USPC .................................................... 705/333
See application file for complete search history.

(56) References Cited

U.S. PATENT DOCUMENTS

| | | | |
|---|---|---|---|
| 2003/0195696 A1* | 10/2003 | Jones ................... | G08G 1/123 340/994 |
| 2004/0215480 A1 | 10/2004 | Kadaba | |
| 2006/0145837 A1* | 7/2006 | Horton ................. | G08G 1/202 340/539.13 |
| 2008/0164185 A1 | 7/2008 | Stemmle | |
| 2008/0255758 A1 | 10/2008 | Graham et al. | |
| 2012/0127202 A1* | 5/2012 | Choi .................... | G01C 21/3697 345/633 |
| 2014/0087772 A1* | 3/2014 | Papa .................... | G06Q 10/047 455/466 |
| 2014/0172739 A1 | 6/2014 | Anderson et al. | |
| 2014/0270356 A1* | 9/2014 | Dearing ................ | B07C 7/005 382/103 |
| 2014/0374478 A1 | 12/2014 | Dearing et al. | |
| 2015/0034720 A1* | 2/2015 | Minogue ............. | G06Q 10/0832 235/385 |
| 2015/0154850 A1* | 6/2015 | Fadell .................. | G06Q 10/083 340/501 |
| 2016/0092456 A1* | 3/2016 | Bonnell ............... | G06F 16/24578 707/724 |
| 2017/0041451 A1* | 2/2017 | Wilkinson ........... | H04W 4/027 |
| 2017/0193444 A1 | 7/2017 | Dearing | |
| 2018/0053233 A1* | 2/2018 | Srivastava ........... | G06F 16/2455 |
| 2019/0061939 A1* | 2/2019 | Anand ................. | G08G 5/0069 |
| 2019/0287051 A1* | 9/2019 | Heinla ................. | G06Q 50/28 |
| 2020/0250473 A1* | 8/2020 | Elluswamy ......... | G16Y 20/10 |

OTHER PUBLICATIONS

Al-Ani, Muzhir Shaban "Packages Tracking Using RFID Technology" Published by International Journal of Business and ICT (Year: 2015).

International Search Report and Written Opinion dated Mar. 17, 2017 in International Application No. PCT/US2017/012119.

International Preliminary Report on Patentability dated Apr. 9, 2018 in International Application No. PCT/US2017/012119.

\* cited by examiner

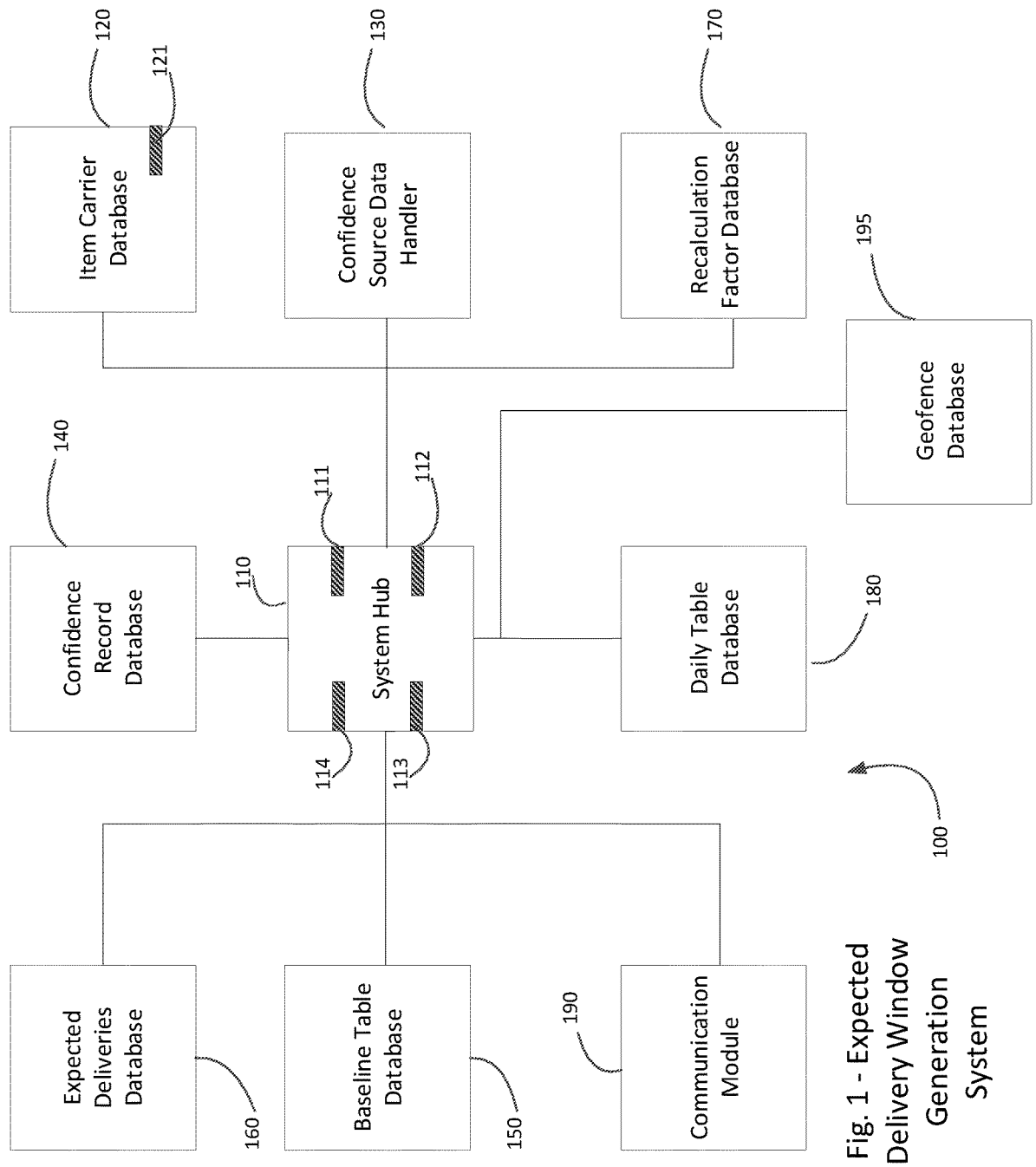
Fig. 1 - Expected Delivery Window Generation System

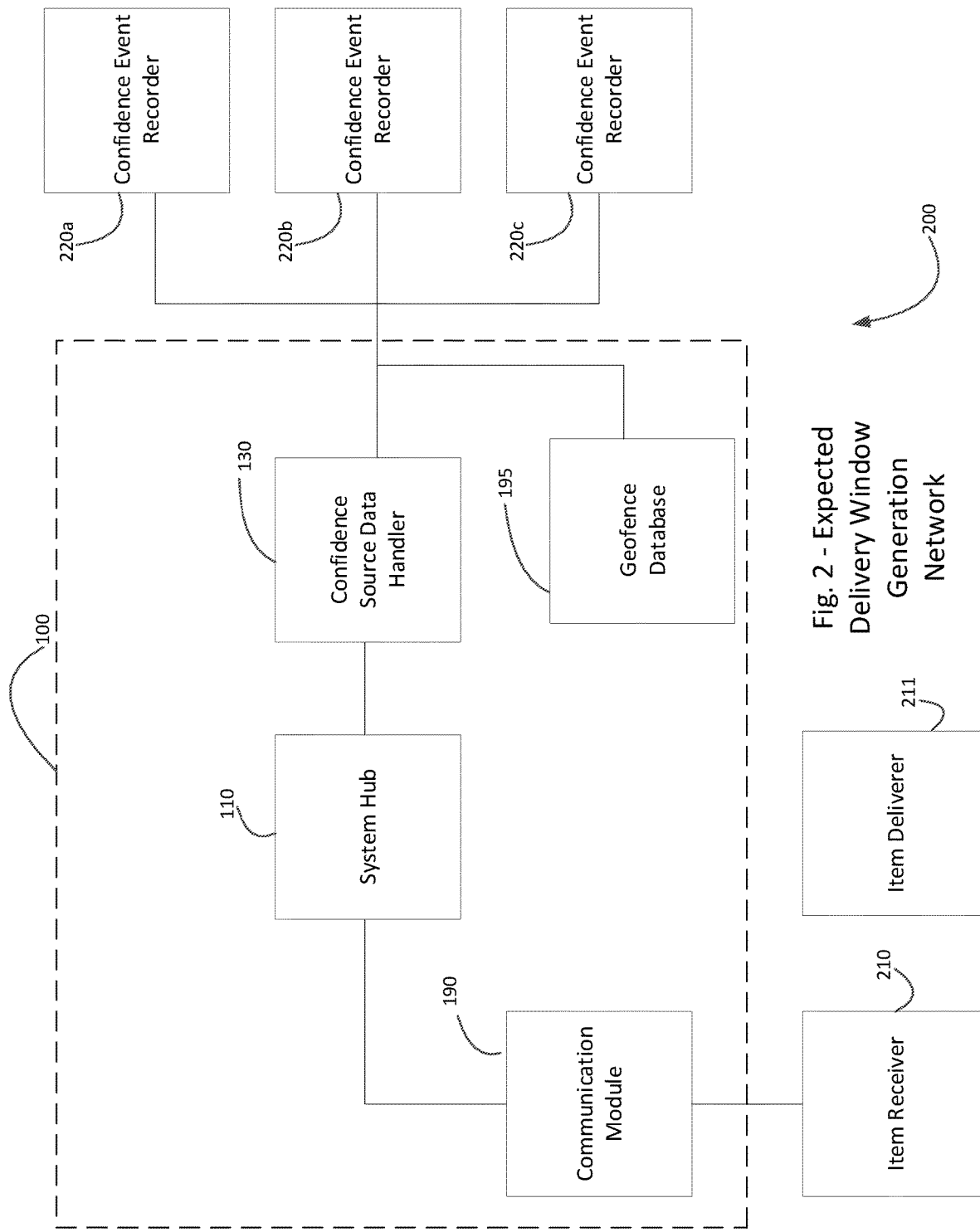

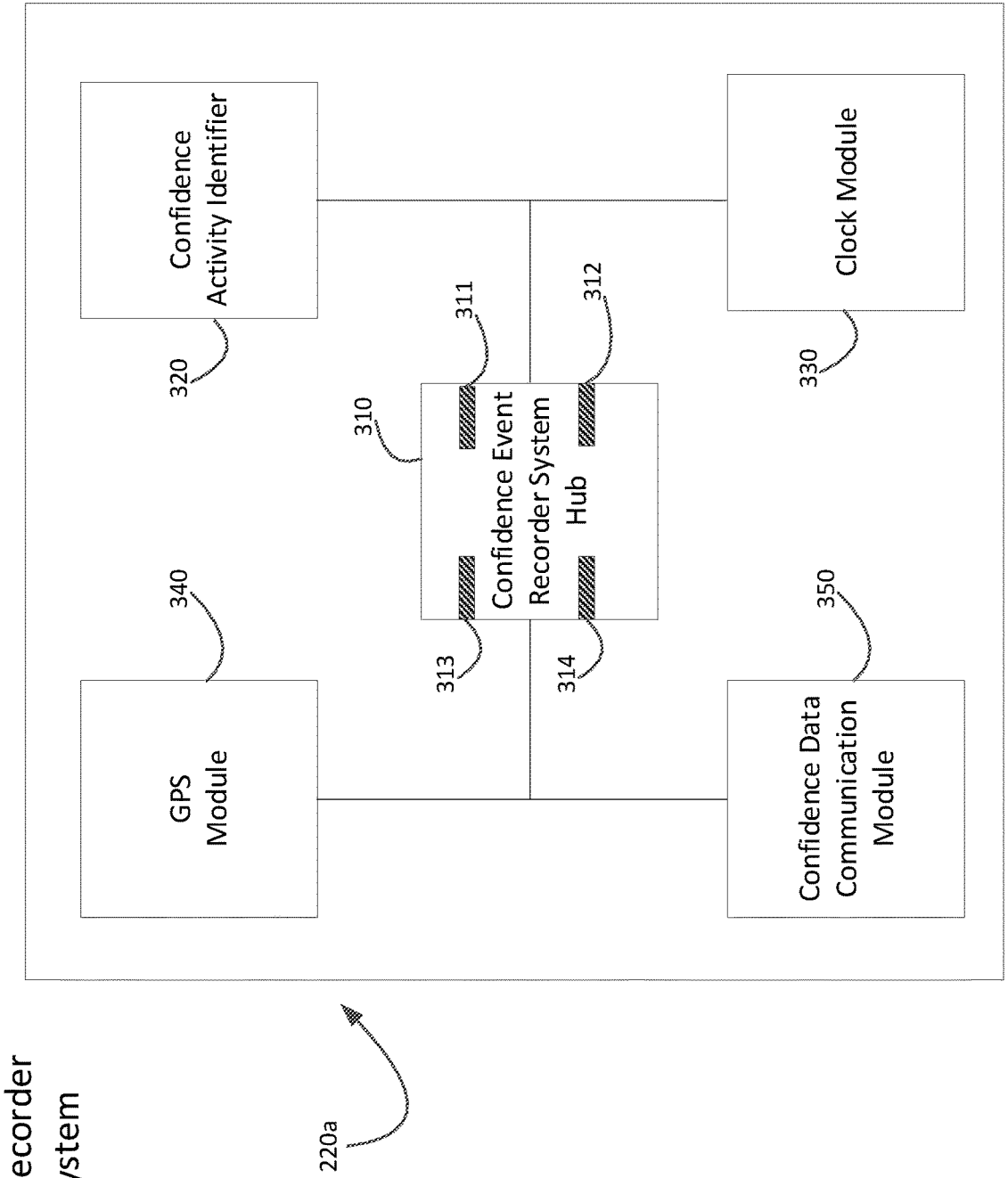
Fig. 3 - Confidence Event Recorder Subsystem

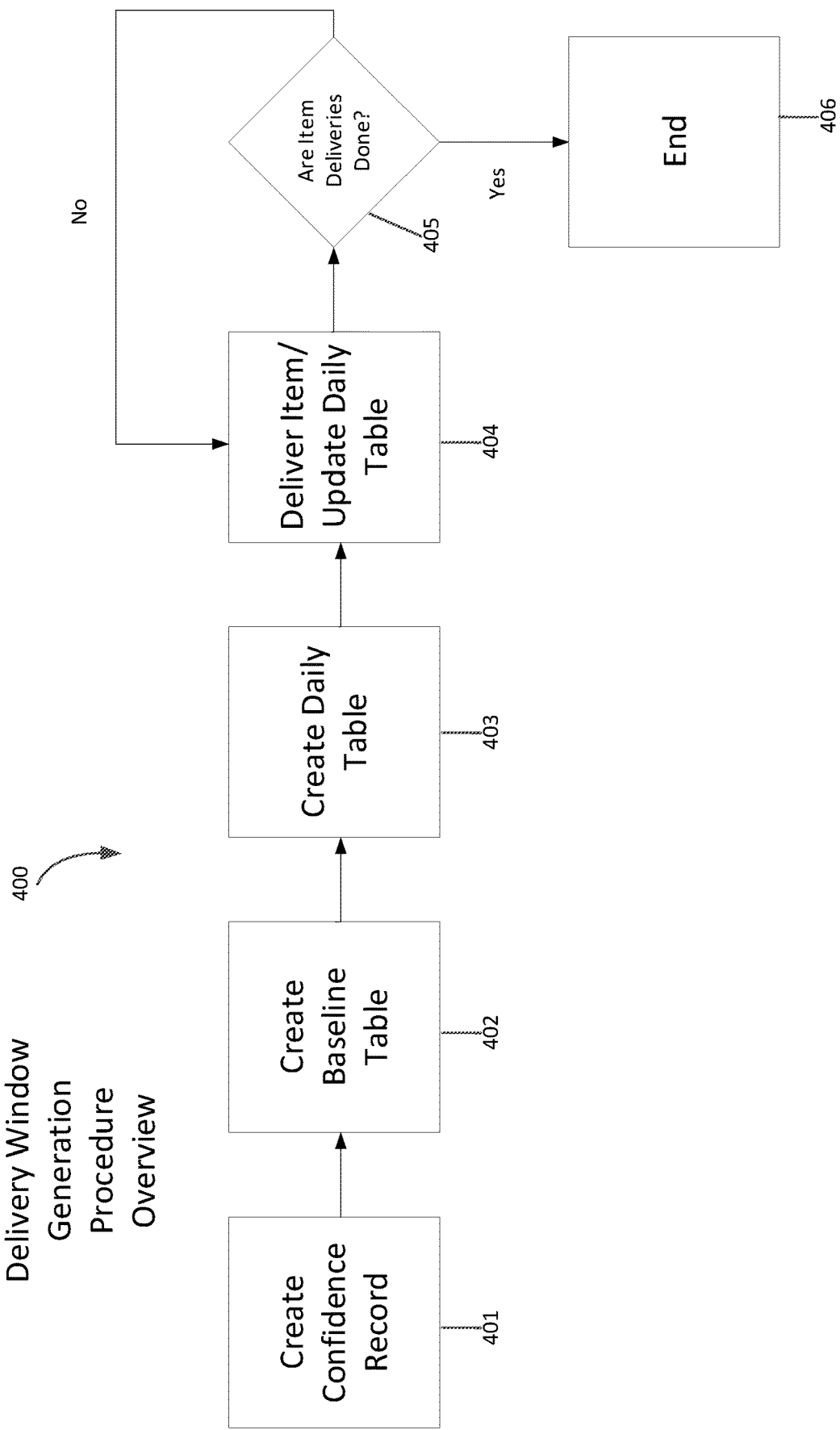

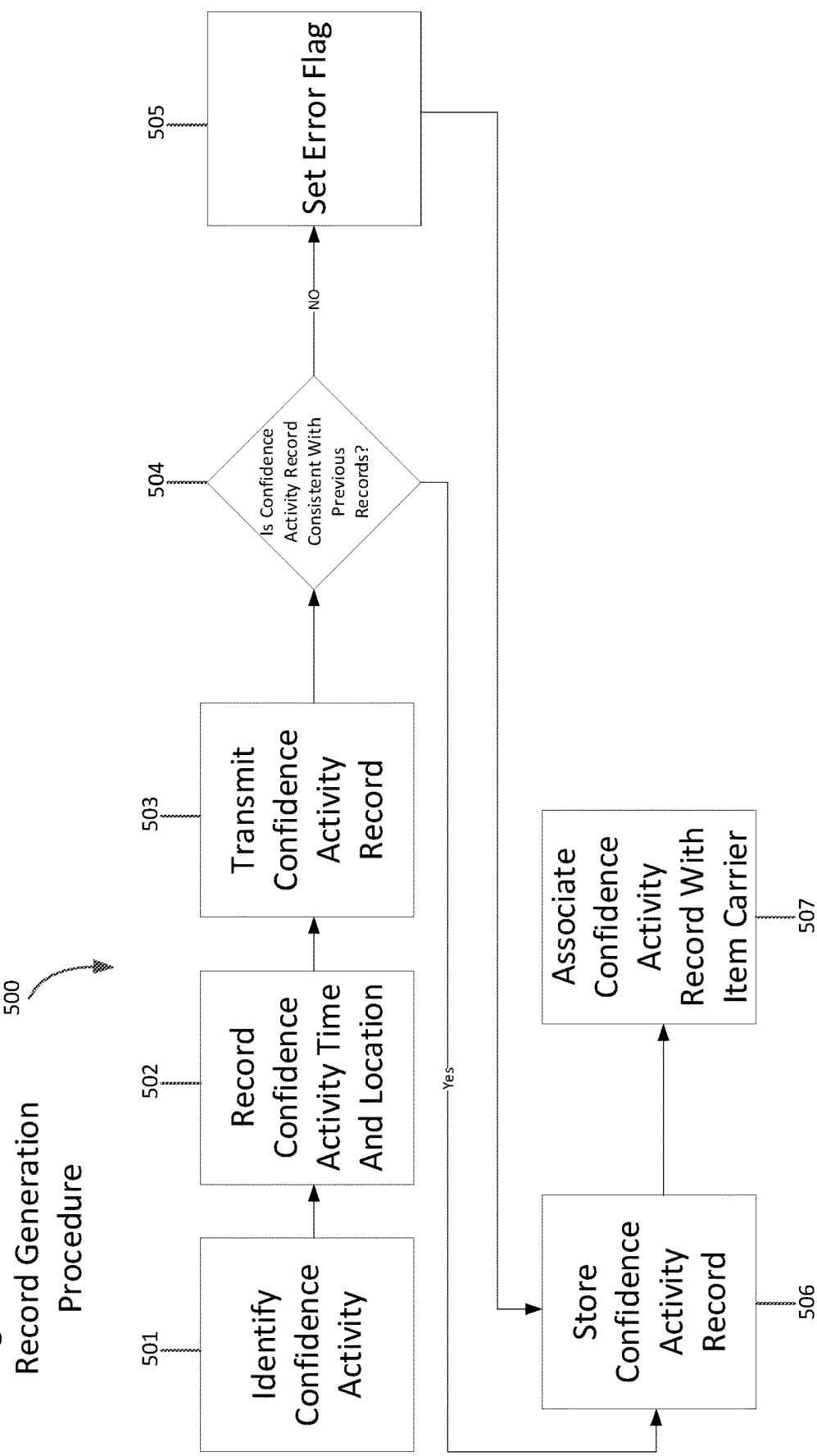

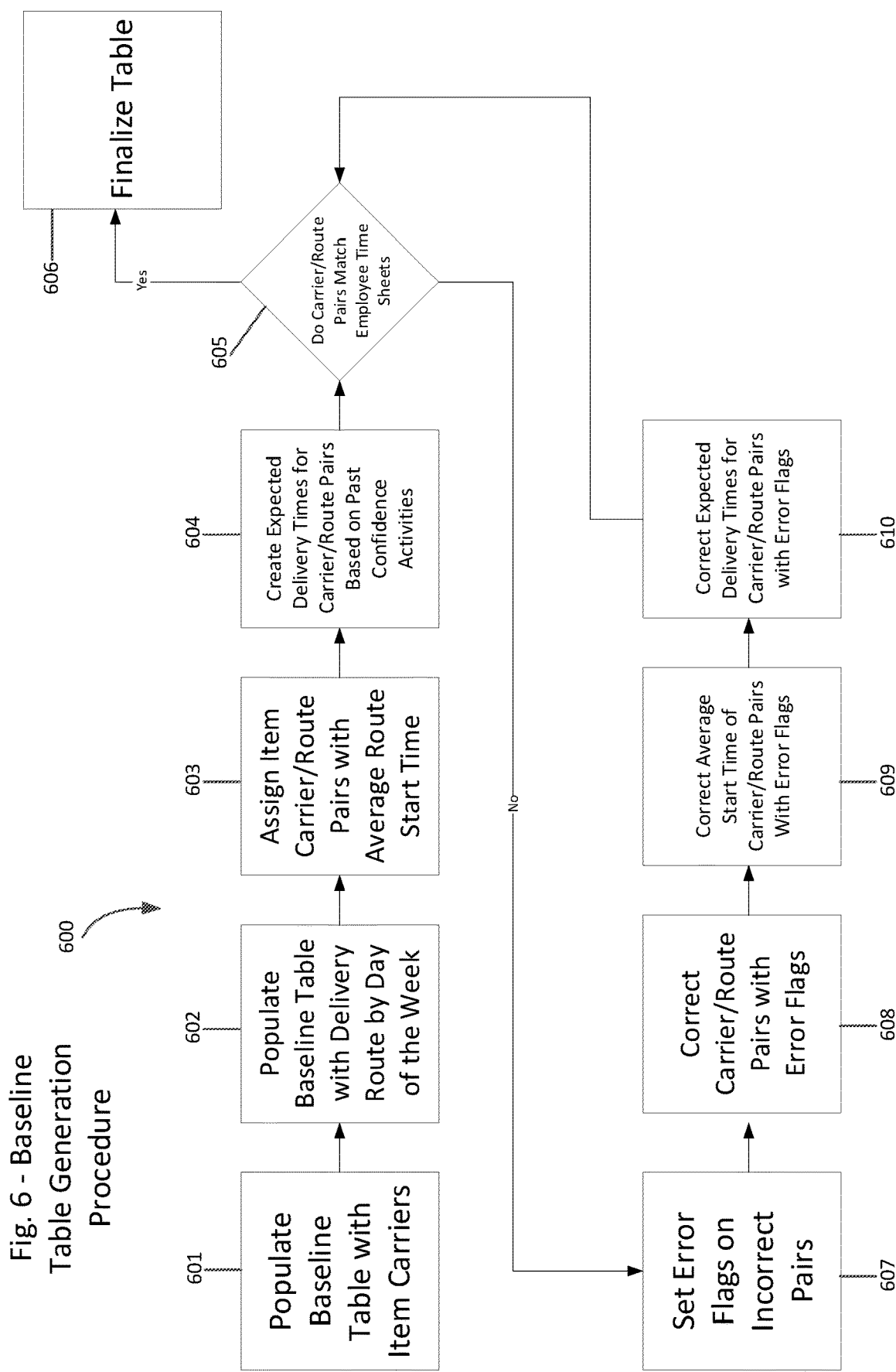
Fig. 6 - Baseline Table Generation Procedure

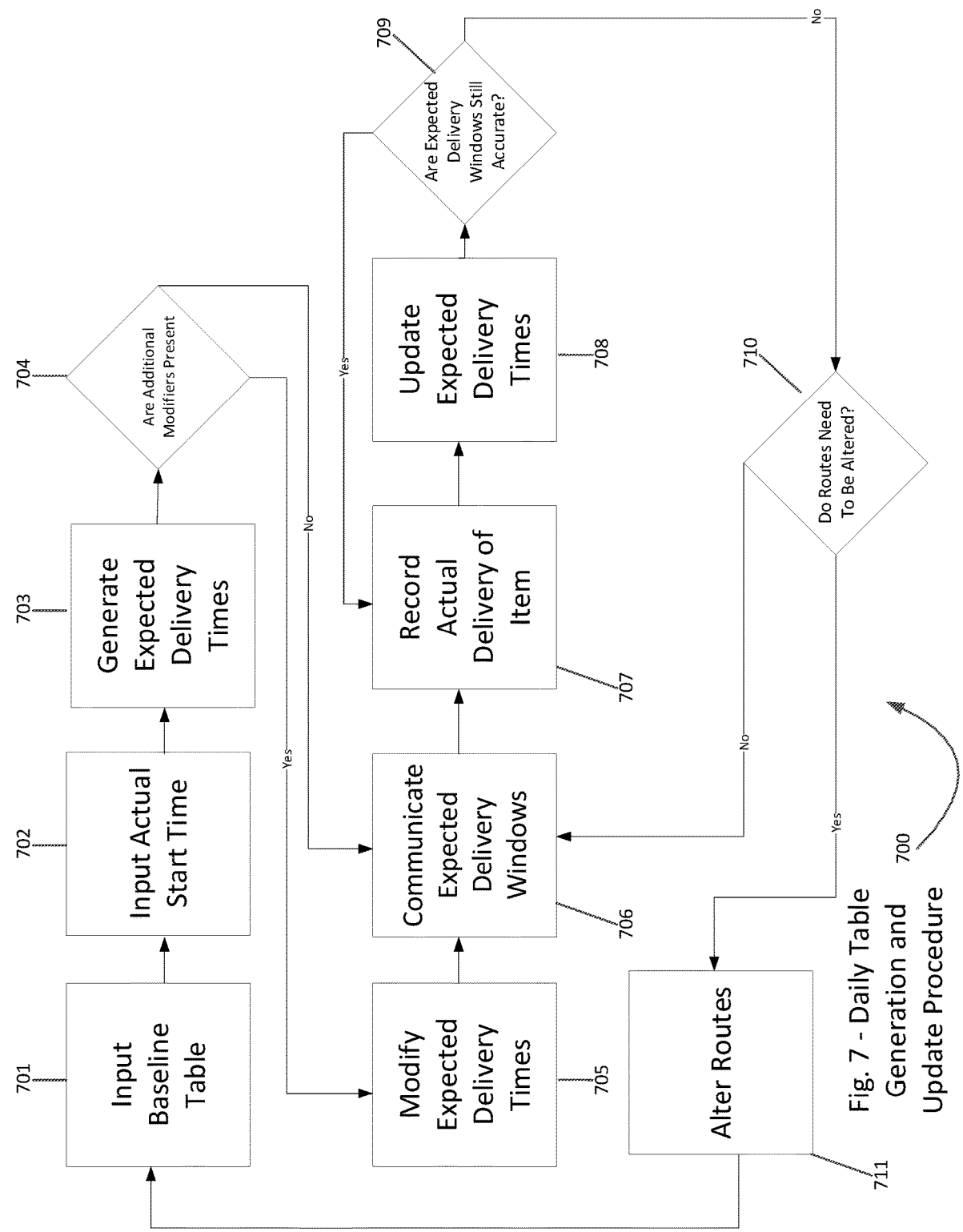

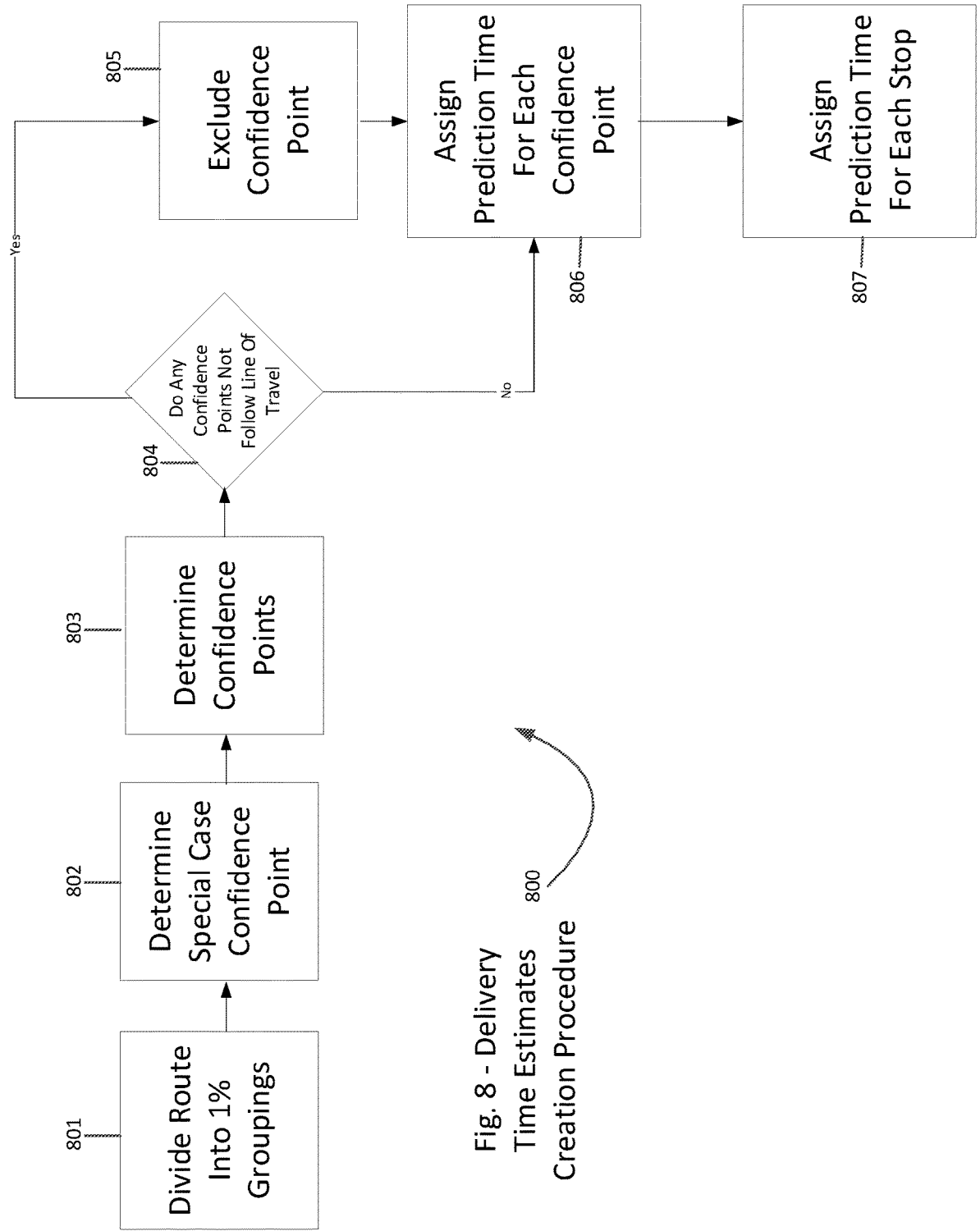
Fig. 8 - Delivery Time Estimates Creation Procedure

USE OF GEOSPATIAL COORDINATE SYSTEMS FOR TRACKING ITEM DELIVERY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a divisional application of U.S. application Ser. No. 16/154,564, filed Oct. 8, 2018, which claims the benefit of priority to U.S. Provisional Application 62/569,729, filed Oct. 9, 2017, the entire contents all of which are hereby incorporated by reference.

BACKGROUND

Field

The development relates to a system and method for accurately tracking the delivery of items in a distribution network.

Description of the Related Art

Item carriers generally wish to be able to accurately track the delivery of items through a distribution network. The accurate tracking of items can be used for many purposes such as changing the routes of item carriers out on delivery based on when items have been delivered or creating expected delivery windows that can be sent to item receivers. Thus a system for accurately tracking the delivery of items in a distribution network is greatly desired.

SUMMARY

Some aspects described herein include a system for delivering an item comprising a route database storing a route comprising a plurality of delivery points; a mobile computing device assigned to a user delivering delivery items along the route, the mobile device configured to scan a physical item at a delivery point and generate scan information; a geo-coordinate database configured to store geo-spatial coordinates of the plurality of delivery points and an indication of a degree of uncertainty about the delivery point's geo-spatial coordinates; a confidence source data handler in communication with the mobile computing device and the geo-coordinate database, the confidence source data handler configured to: prompt the mobile computing device to request that the user of the mobile device scan a physical item at one of the plurality of delivery points based at least in part on the record indicating a degree of uncertainty about the one of the plurality of delivery points; and to receive scan information based on the scan of the physical item at the one of the plurality of delivery points.

In some embodiments, the geo-coordinate database records the geographic position of the mobile computing device relative to the delivery point.

In some embodiments, the confidence source data handler is configured to prompt the mobile computing device based on the geographic position of the mobile computing device.

In some embodiments, the geo-coordinate database is configured to update the geo-spatial coordinates stored for a delivery location based at least in part on scan information received by the confidence source data handler after the confidence source data handler has prompted the mobile computing device.

In some embodiments, the scan information received by the confidence source data handler includes a set of geo-coordinates corresponding to where the location where the scan of the physical item occurred.

In some embodiments, the geo-coordinate database is configured to update the geo-coordinates stored for a delivery location based on the set of geo-coordinates corresponding to where the location where the scan of the physical item occurred.

In another aspect described herein, a system for delivering an item comprises a route database storing a route comprising a plurality of delivery points; a mobile computing device assigned to a user delivering delivery items along the route, the mobile device configured to scan a physical item at one or more delivery points and generate scan information; a confidence source data handler in communication with the mobile computing device the data handler configured to: receive first scan information associated with a delivery of a first item to a first one of the plurality of delivery points; and receive second scan information associated with a delivery of a second item to a second one of the plurality of delivery points; a baseline table database in communication with the confidence source data handler, the baseline table database configured to create, based on the first and second scan information, a virtual confidence event associated with the delivery of a physical item at a third one of the plurality of delivery points based on the first and second scan information.

In some embodiments, the third delivery point is between the first one and the second one of the plurality of delivery points along the route.

In some embodiments, the first and second scan information comprise the time and location where a physical item was scanned.

In some embodiments, the location where the physical item is scanned is determined via a geofence.

In some embodiments, the baseline table database is configured to create the virtual confidence event based at least in part on an estimate of when and where the delivery of an item would have occurred.

In another aspect described herein, a method for delivering an item comprises storing, in a route database, a route comprising a plurality of delivery points; generating, with a mobile computing device assigned to a user delivering delivery items along the route, scan information associated with the scan of a physical item at one or more delivery points; storing, in a geo-coordinate database, a record associated with a delivery location which indicates a degree of uncertainty about the delivery location's geo-spatial coordinates; prompting the mobile computing device to request that the user of the mobile computing device scan a physical item; and generating scan information based on the degree of uncertainty about the delivery location.

In some embodiments, the method further comprises recording, with the geo-coordinate database, the geographic position of the mobile computing device relative to the delivery point.

In some embodiments, the method further comprises prompting the mobile computing device based at least in part on the geographic position of the mobile computing device.

In another aspect described herein, a method for delivering an item comprises storing, in a route database, a route comprising a plurality of delivery points; generating, with a mobile computing device assigned to a user delivering delivery items along the route, scan information associated with the scan of a physical item at one of the plurality of delivery points; receiving, at a confidence source data handler, first scan information associated with a first delivery point; receiving, at a confidence source data handler, second scan information associated with a second delivery point; creating, based on the first and second scan information, a virtual confidence event associated with the delivery of a physical item at a third delivery point; and storing, in a baseline table database in communication with the confidence source data handler, the virtual confidence event.

In some embodiments, the third delivery point is between the first and second delivery point along the route.

In some embodiments, the first and second scan information comprise the time and location where a physical item was scanned.

In some embodiments, the location where the physical item is scanned is determined via a geofence.

In some embodiments, the virtual confidence event is created based at least in part on an estimate of when and where the delivery of an item would have occurred.

One aspect described herein relates to a system for accurately tracking the delivery of items comprising a plurality of items having a barcode thereon; an item sorter comprising a barcode scanner, a network connection and a plurality of disposition portions, wherein the item scanner is configured to scan the barcodes of a plurality of items according and to sort the items into the disposition portion based at least in part on route and preference information received over the network connection; and a mobile computing device comprising a barcode scanner and a GPS unit wherein the barcode scanner is configured to scan the barcodes on at least one of the plurality of items at the delivery point for that item and wherein the mobile computing device is configured to generate confidence data comprising at least a location and time recorded by the GPS unit upon scanning the item at the delivery point.

In an another aspect a system for delivering an item comprises a mobile computing device comprising a scanner configured to scan a physical item; a confidence source data handler configured to receive scan information from the mobile computing device and determine whether scan information is indicative of a confidence event; a daily table database configured to receive confidence event information from the confidence source data handler and generate at least one expected delivery time and an expected delivery window based at least in part on the confidence data; and a communication module configured to communicate the expected delivery window to a recipient of an item.

The mobile computing device may further comprise a GPS module configured to record location data and/or a clock module configured to record time data. The mobile computing device may be further configured to identify that a confidence activity has occurred. The mobile computing device can identify that a confidence activity has occurred via a barcode scanner.

The system may further comprise a baseline table database that is configured to store at least one estimated expected delivery time.

Further, the daily table database can be configured to generate at least one delivery time based at least in part on at least one estimated expected delivery time stored in the baseline database.

The system may further comprise a recalculation factor database configured to store recalculation factors for generating at least one expected delivery time. The daily table database can be configured to generate at least one delivery time based at least in part on at least one recalculation factor stored in the recalculation factor database. The communication module can also be configured to communicate the at least one expected delivery window to at least one entity expecting delivery of an item.

In some embodiments, the system for delivering an item may also comprise: a mobile computing device comprising a scanner configured to scan a physical item and generate scan information; a geo-coordinate database in communication with the confidence source data handler, configured to store a record associated with each delivery location which indicates a degree of uncertainty about that delivery location's geo-spatial coordinates; a confidence source data handler in communication with the mobile computing device configured to receive scan information from the mobile computing device, determine whether scan information is indicative of a confidence event, and prompt the mobile computing device to request that the user of the mobile device scan a physical item and generate scan information based at least in part the record indicating a degree of uncertainty about a delivery location.

The system can further comprise a geo-coordinate database of delivery locations, wherein the geo-coordinate database stores geo-coordinates for delivery location.

In some embodiments, the confidence source data handler is in communication with the geo-coordinate database and is configured to prompt the mobile computing device based at least in part on the position of the mobile computing device.

In some embodiments, the geo-coordinate database is can also be configured to update the geo-coordinates stored for a delivery location based at least in part on scan information received by the confidence source data handler after the confidence source data handler has prompted the mobile computing device. In some embodiments, the scan information received by the confidence source data handler includes a set of geo-coordinates corresponding to where the scan occurred. The geo-coordinate database can also be configured to update the geo-coordinates stored for a delivery location based on additional scan information associated with a delivery location.

In some embodiments, the system for delivering an item can comprise: a mobile computing device comprising a scanner configured to scan a physical item and generate scan information; a confidence source data handler in communication with the mobile computing device configured to receive scan information from the mobile computing device and determine whether scan information is indicative of a confidence event; and a baseline table database in communication with the confidence source data handler configured to create a virtual confidence event associated with the delivery of a physical item based on first information regarding the mobile computing device and second information regarding the mobile computing device.

In some embodiments, the first information regarding the mobile computing device is first scan information received by the confidence source data handler and wherein the second information regarding the mobile device is second scan information received by the confidence source data handler In some embodiments, the baseline table database is further configured to create a virtual confidence event associated with deliveries that do not have scan information associated with them. The baseline table database can also be configured to create a virtual confidence based on scan information received by the confidence source data handler. In some embodiments, the baseline table database is also configured to create the virtual confidence event based at least in part on an estimate of when and where a delivery of an item would have occurred.

In some embodiments, the first information regarding the mobile computing device is first scan information received by the confidence source data handler and wherein the second information regarding the mobile computing device is the current position of the mobile computing device. In some embodiments, the current position of the mobile computing device is determined via geofence.

In some embodiments, the system can comprise communication module designed to require input from a user interface regarding a delivery point and a user interface configured to allow a user to record of the coordinate for a delivery point and designate item delivery preferences for the delivery point.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

FIG. 1 is a block diagram displaying one embodiment of the expected delivery window generation system.

FIG. 2 is a block diagram that displays one embodiment of how external components can communicate with the expected delivery window generation system.

FIG. 3 is a block diagram displaying one embodiment of a confidence event recorder subsystem.

FIG. 4 is a flow chart depicting one embodiment of a process for generating expected delivery windows.

FIG. 5 is a flow chart depicting one embodiment of a process for generating the confidence record.

FIG. 6 is a flow chart depicting one embodiment of a process for generating the baseline table.

FIG. 7 is a flow chart depicting one embodiment of a process for generating the daily table.

FIG. 8 is a flow chart depicting one embodiment of a process for determining delivery time estimates for creating a baseline table.

DETAILED DESCRIPTION

Businesses, consumers, and other entities generally desire to know the time that an item will be delivered to them when they are expecting a delivery. An item may include packages, luggage, mail, pizza, or anything else that can be delivered to a consumer or business. Thus, a system that can accurately predict when an item will be delivered is advantageous.

One way to predict when an item will be delivered is to record the time and place of past item deliveries and then determine when an item will be delivered based on past trends. To ensure a reliable delivery window prediction, the record of the time and place of the past item deliveries should be accurate or be based on reliable information. One way to ensure the accuracy of the record is to record the time and location of item deliveries that have hallmarks of reliability or accuracy, which can be termed "confidence activities." A confidence activity is an activity performed by the item carrier that is delivering the item that provides a high level of confidence that the time and location of the record reflect the actual time and location of item delivery. For example, scanning a computer readable code on a central mailbox, called a Managed Service Point, could be a confidence activity because there is a high degree of confidence that the computer readable code was scanned when an item was actually delivered. Similarly, scanning a computer readable code on an item weighing under 16 ounces or on other types of items can be a confidence activity because these items can be delivered to a receptacle located at a specific, known location, and therefore, there is a high degree of confidence that the computer readable code was scanned at the actual time an item was delivered and at the actual specific location. To further ensure accuracy, records of confidence activities can be compared to past records to ensure accuracy, or messages can be sent to item deliverers to prompt the performance of confidence activities.

The features, aspects, and advantages of the present development will now be described with reference to the drawings of several embodiments which are intended to be within the scope of the embodiments herein disclosed. These and other embodiments will become readily apparent to those skilled in the art from the following detailed description of the embodiments having reference to the attached figures, the development not being limited to any particular embodiment(s) herein disclosed.

The system and method described herein relate to generating and communicating an expected delivery window. FIG. 1 depicts an embodiment of a system 100 for generating an expected delivery window. The expected delivery window generation system 100 comprises a system hub 110, an item-carrier database 120, a confidence source data handler 130, a recalculation factor database 170, a daily table database 180, a communication module 190, a baseline table database 150, an expected deliveries database 160, and a confidence record database 140. The system hub 110 is in communication, either wired or wirelessly, with at least the item carrier database 120, the confidence source data handler 130, the recalculation factor database 170, the daily table database 180, the communication module 190, the baseline table database 150, the expected deliveries database 160, and the confidence record database 140.

The system hub 110 may comprise or be a component of a processing system implemented with one or more processors. The system hub 110 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The system hub 110 may comprise a processor 111 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processor 111 typically has conventional address lines, conventional data lines, and one or more conventional control lines. The processor 111 may be in communication with a processor memory 112, which may include, for example, RAM memory, flash memory, ROM memory, EPROM memory, EEPROM memory, registers, hard disk, a removable disk, a CD-ROM, or any other form of storage medium known in the art. The processor memory 112 may include, for example, software, at least one software module, instructions, steps of an algorithm, or any other information. In some embodiments, the processor 111 performs processes in accordance with instructions stored in the processor memory 112. These processes may include, for example, controlling features and/or components of the expected delivery window generation system 100, and controlling access to and from, and transmitting information and data to and from the system hub 110 and the constituent components of the expected delivery window generation system 100, as will be described herein.

The system hub 110 comprises a system memory 113, configured to store information, such as confidence data, item-carrier information, expected deliveries data and the like. The system memory 113 may comprise a database, a comma delimited file, a text file, or the like. The system hub 110 is configured to coordinate and direct the activities of the components of the expected delivery window generation system 100, and to coordinate generating expected delivery windows for the delivery of items.

In some embodiments, the processor 111 is connected to a communication feature 114. The communication feature 114 is configured for wired and/or wireless communication. In some embodiments, the communication feature 114 communicates via telephone, cable, fiber-optic, or any other wired communication network. In some embodiments, the communication feature 114 may communicate via cellular networks, WLAN networks, or any other wireless network. The communication feature 114 is configured to receive instructions and to transmit and receive information among components of the expected delivery window generation system 100, and in some embodiments, with a central server (not shown) or other resource outside the expected delivery window generation system 100, as desired.

In some embodiments, the system hub 110 is in communication with the item-carrier database 120. In some embodiments, the item-carrier database 120 may comprise a processor, memory, databases, address and control lines, and other components similar to those described herein for the system hub 110. In other embodiments, the item-carrier database 120 may be configured to use the processor, memory, databases, address and control lines, and other components of the system hub 110, or a combination of its own components and the system hub 110's components. It is to be understood that the term database is not limited to a component that only stores data but, in some embodiments, the databases described herein can also be used to manipulate data, edit data, generate new data, and other functions. Databases can store information in multiple file formats, arrangements, tables, etc. Databases herein may have dedicated or shared processors or memory.

In some embodiments, the item-carrier database 120 is configured to store information about the entities that will deliver items. In some embodiments, these entities are delivery persons or delivery services. In some embodiments, the item carrier database 120 is configured to store information about the geographical routes that the entities deliver items on. For example, the item carrier database 120 can store a set of addresses that are assigned to a particular item carrier to deliver items to, such as a pre-determined route. In some embodiments, the route can comprise a set of delivery points that correspond to the set of address. In some embodiments, the routes can be stored in a route database internal to the item-carrier database 120 or in some other external route database. In some embodiments, the item carrier database 120 can generate routes for each item carrier. In some embodiments, the item carrier database can generate routes based on the expected deliveries for the day and item receiver preferences for what time items should be delivered. For example, if some item receivers are receiving an item today prefer morning deliveries and some prefer afternoon, the item receiver can generate routes accordingly. In some embodiments, information about deliveries for the day can be stored in expected deliveries database 160 and item receiver preferences can be receive through communication module 190, discussed further below. In some embodiments the item carrier database 120 can also be configured to generate alternate routes based upon changes in item receiver preferences or an item carrier failure or success in delivering an item. For example, if an item carrier fails to deliver an item, item carrier database 120 can calculate new routes so that the item carrier can attempt to deliver the item at another time on the same day. In some embodiments, the item carrier database 120 can store a different geographical route for each item carrier for each day of the week. The item carrier database 120 can also store an actual and a scheduled departure time for each item carrier on their route on a given day. In some embodiments, the item carrier database 120 can also store timesheets or records that confirm when various entities worked and at what times those entities worked.

In some embodiments, the distribution network includes processing equipment, such as mail processing equipment. The mail processing equipment can be automated equipment for receiving, scanning, sorting, stamping, or otherwise processing the item. in some embodiments, the expected delivery window generation system 100 comprises a sorter 121. The sorter 121 can include one or more belts, diverter gates for diverting an item to a sorting destination, a scanner for reading a surface of the item, such as a computer readable identifier, an address, an identifier, etc., on the surface of the item. The sorter 121 comprises a processor in communication with item carrier database 120. In some embodiments, the sorter 121 may be part of the item carrier database 120 or may be controlled by the item carrier database 120. The sorter 121 can be used as part of an item management system to manage the coordination of the delivery of items by ensuring that the item carriers receive the right items to deliver. In some embodiments, the sorter 121 could be a Delivery Barcode Scanner, High Speed Flats Feeder, or a Parcel Sorting Machine, like those used by the United States Postal Service, or some other type of sorting machine or some system or combination of sorting machines like those listed. In some embodiments the sorter also comprises a disposition portion where items can be sorted into. For example, the item sorter can sort items into a plurality of bins wherein each bin corresponds to a different route. In some embodiments the sorter 161 sorts items based upon the entries in the expected delivery database 160, discussed further below. In some embodiments, the items sorter can be entirely separate from the item carrier database 120 and can instead sort items based upon item receiver preferences and route information received over a network connection.

In some embodiments, the system hub 110 is in communication with the confidence source data handler 130. In some embodiments, the confidence source data handler 130 may comprise a processor, memory, databases, address and control lines, and other components similar to those described herein for the system hub 110. In other embodiments, confidence source data handler 130 may be configured to use the processor, memory, databases, address and control lines, and other components of the system hub 110, or a combination of its own components and the system hub 110's components.

The confidence source data handler 130 is configured to receive confidence data, review confidence data, and then transfer confidence data for storage in the confidence record database 140. In some embodiments, the confidence source data handler 130 can also inform the daily table database 180 that a delivery has occurred when it receives confidence data. In some embodiments, the confidence source data handler 130 receives confidence data from a confidence event recorder 220a, 220b, and/or 220c, as described further below. In some embodiments, the confidence source data handler 130 can communicate with the confidence event recorders 220a-220c via a communications link such as a telephone, cable, fiber-optic, or any other wired communication network. In some embodiments, the confidence source data handler 130 can communicate with the confidence recorder 220a-220c via cellular networks, WLAN networks, or any other wireless network. In some embodiments the confidence source data handler 130 can command the confidence recorder 220a-220c to record confidence data.

In some embodiments, the confidence data received by the confidence source data handler 130 comprises a record of a confidence activity accompanied by the time and location that the activity occurred, and an identity of confidence activity type. The time and place can be represented by a timestamp for the confidence activity and a GPS recorded latitude and longitude of where the confidence activity occurred. In some embodiments, the confidence activity is an activity performed by an item carrier that provides a high level of confidence that the time and location of the record reflects the actual time and location of the activity. In some embodiments, the confidence activity is recorded by scanning a computer readable code, such as a barcode, when the activity occurred. For example, a confidence activity can be recorded by scanning a barcode on an item when that item is delivered at a delivery point or physical address. A confidence activity can also be recorded by scanning a barcode on a delivery receptacle when an item is delivered. In some embodiments, the confidence source data handler 130 can send a prompt to one of the confidence event recorders 220a-220c that requests that the item carrier record a confidence activity or identify a scan event as a confidence activity. In some embodiments, the prompt to perform a confidence activity can be sent when there is a degree of uncertainty of the precise physical location or geospatial coordinates of a delivery location that the confidence activity will take place at. For example, a geo-coordinate database of delivery addresses may have some error or uncertainty about the exact coordinates of a delivery point. When such uncertainty or error is identified, the system can request a confidence activity be performed to provide geospatial coordinate data. In some embodiments, the geo-coordinate database can store a record associated with each delivery location that identifies the degree of uncertainty. In some embodiments, this record can be a number from 1-5 with 1 being most uncertain, and 5 being certain. Then the requested confidence activity can be used to determine the precise physical location or geospatial coordinates of the delivery location. Specifically, the system can request that a parcel scan occur at a delivery point for which the coordinate data is uncertain, incorrect, or missing. The item deliverer 211 can scan the parcel or a code on a delivery receptacle, or both, using a mobile computing device. The mobile computing device can record the geospatial coordinates of the mobile computing device at the time of the scan, and send these coordinates to the system 100. The system hub 110, or another connected system can receive these coordinates and update a geo-coordinate database. In some embodiments, the system hub 110 or other connected system can use coordinates from one or more scan events at the delivery point and average or otherwise determine a most likely correct, or an accurate within an acceptable degree of tolerance, coordinate for the delivery point.

The system hub 110 or other system may identify an item carrier progressing along a delivery route. If the system hub 110 identifies that geospatial coordinate data is missing, incorrect, uncertain, or missing for a delivery point along the route, the system hub 110 can request that confidence activities, such as scans, occur at the identified delivery point. In some embodiments the prompt can be sent if the item deliverer has gone a certain period of time without recording a confidence activity, such as 1 hour, 2 hours, or 30 minutes. In some embodiments, this prompt can be sent when one of the confidence event recorders 220a-220c is within a certain distance of where the confidence activity is supposed to occur. The confidence data can also be "breadcrumb" data, which is a record of periodic polls of the item carrier's location.

In some embodiments, the confidence source data handler 130 can also create virtual confidence activities based upon the confidence data it receives. For example, if an item carrier is progressing along a route delivering items, the item carrier might record confidence activities at the first and fourth stop along the route, but not on the second and third stop. When the confidence source data handler 130 receives confidence data from the confidence activities at the first stop and fourth stop, the confidence source data handler can assume that the mail was delivered at the second and third stops. The confidence source data handler 130 can then create virtual confidence activities with confidence data based on an estimate of when and where the delivery would have occurred. For example, the confidence data could be the latitude and longitude of where the item was supposed to be delivered and an estimated time sometime between when the first stop and the fourth stop occurred based on the confidence data for those stops.

Such events can be termed logical events, and the system can record when logical delivery events occur, such as when an item is to be delivered to the second stop, and confidence activities are recorded for the first stop and the fourth stop. The system hub 110 can infer that a delivery occurred, and can identify GPS breadcrumb data passing the second stop where no confidence activity occurred. The system hub 110 creates a logical delivery event, and updates an item database indicating that the item was delivered.

In some embodiments the confidence source data handler 130 can evaluate the confidence data before it transfers the data to the confidence record database 140. For example, the confidence source data handler 130 can evaluate the confidence data to see if the location of the confidence activity is accurate. If the location of the confidence activity is inaccurate, the confidence source data handler 130 can set an error flag on the confidence data. Flagged confidence data may not be evaluated. In some embodiments, the confidence source data handler 130 can evaluate the accuracy of the location of the confidence activity by comparing it to a previously recorded confidence activity. For example, if the confidence activity is scanning the barcode on an item when delivering the item, the confidence source data handler 130 can determine if the location of the scan as reported by one of the confidence event recorders 220a-220c occurred near the location of previous reported locations for scans for delivering items at the same physical location. If the confidence activity is scanning the computer readable code on a delivery receptacle, the confidence source data handler 130 can determine if the reported location of the scan occurred near the reported location of previous scans of that delivery receptacle. If the collected confidence data is breadcrumb data, the confidence source data handler 130 can determine if the breadcrumb data matches the route that the item carrier is delivering items along. In some embodiments, the confidence source data handler 130 can compare the location of the current scans to the average of previous scans, or to a running average such as the average of the last 14 scans for that location. In some embodiments, the confidence source data handler 130 can compare the location of the current scans to the average of the last 120 days for that location or other periods of time.

In some embodiments, the confidence source data handler 130 can determine if the reported location of a scan occurred within a predetermined range of the actual physical location by determining if the scan occurred within a vector of the actual physical location. The vector of a location is a set of coordinates extending from a midpoint of the actual physical location to a point along a potential delivery route for the actual physical location. For example, if the correct location is a house, the vector of the house is a set of geographic coordinates that extends from the exact midpoint or near the exact midpoint of the house to the middle of the street. The street is chosen in this example as it is the delivery route along which the item carrier will be walking or driving in order to deliver an item to the house. In other embodiments, the vector extends from the midpoint of the actual physical location toward a hallway, pathway, conduit, or any other route along which an item carrier will travel. In some embodiments, the correct location can be even more specific, such as the mailbox, porch, or driveway of a particular house.

In some embodiments, the geospatial coordinates of the actual physical location can itself be determined based upon the confidence data. For example, if the confidence activity is the scan of a barcode at the delivery receptacle or the scan of a package when delivered to a delivery point, the location of all of these scans can be stored in the confidence record database 140. Then the actual physical location of a delivery receptacle can be determined based upon the average location of all the confidence data recorded during an item delivery to that receptacle. In some embodiments, the confidence source data handler 130 can determine the actual physical location as outlined above.

In some embodiments, the system hub 110 is in communication with the confidence record database 140. In some embodiments, the confidence record database 140 may comprise a processor, memory, databases, address and control lines, and other components similar to those described herein for the system hub 110. In other embodiments, the confidence record database 140 may be configured to use the processor, memory, databases, address and control lines, and other components of the system hub 110, or a combination of its own components and the system hub 110's components.

The confidence record database 140 is configured to receive confidence data from confidence source data handler 130. In some embodiments, the confidence source data handler 130 can communicate directly with the confidence record database 140. In other embodiments, the confidence source data handler 130 can communicate with the confidence record database 140 through system hub 110. In some embodiments, the confidence record database 140 will store the confidence data for later use by the system. In some embodiments, the confidence record database 140 will store the confidence data along with the error flags set by the confidence source data handler 130. In some embodiments, confidence record database 140 can also associate the confidence data with the data stored in the item carrier database 120. For example, the confidence record database can associate confidence data with the item carrier that generated the data, the route that the item carrier was delivering items on when generating that data, and the start time of the item carrier on the day the data was generated.

In some embodiments the confidence record database can also use the confidence data it received from both confidence activities and virtual confidence activities to also record the fact that an item delivery occurred at that time. This data combined with information regarding when the item was received from the item deliver for delivery can then be used to track how long it took for a delivery to occur. This can then be stored and transmitted to interested parties.

The system hub 110 is in communication with the baseline table database 150. In some embodiments, the baseline table database 150 may comprise a processor, memory, databases, address and control lines, and other components similar to those described herein for the system hub 110. In some embodiments, the baseline table database 150 may be configured to use the processor, memory, databases, address and control lines, and other components of the system hub 110, or a combination of its own components and the system hub 110's components.

In some embodiments, the baseline table database 150 is configured to store baseline tables. Baseline tables are tables that contain estimated delivery times for a particular geographic route. These estimated delivery times can be calculated as described further below. In some embodiments, the baseline table contains estimates for a particular route/item carrier pairing. A route/item carrier pairing is the geographical route on which a particular item carrier will deliver items. In some embodiments, these route/item carrier pairings can differ between different days of the week. In some embodiments the estimated delivery time for the route/item carrier pairings are created based on the data stored in the confidence record database 140. For example, the confidence activity records include times a particular item carrier delivers items to a particular location. The baseline table database 150 gathers these historical records, and generates an average time that a particular item carrier or carrier delivers items to a particular address. This average time is set as the estimated delivery time in the baseline table. The baseline table database 150 may generate the average delivery time using a rolling average, such as the average for the last 180 days, or may use a historical average, such as using data for the same time period in a previous year, or for the same day of the week as in the last 10 weeks.

In another example, the estimated delivery times can be based on the actual delivery times derived from the data stored in the confidence record database 140 for a route/item carrier pairing that is the same or similar to the route/item carrier pairing that the baseline table database is calculating estimated delivery time for. The estimated delivery times could also be calculated based on the average of the actual delivery times from the same or similar route/item carrier pairings. This average could similarly be a rolling average over, for example, 180 days, or it may use a historical average, such as using data for the same time period in a previous year, or for the same day of the week as in the last 10 weeks. In some embodiments, the baseline table database 150 can compare the baseline table against the timesheet records of the delivery entities to verify whether the baseline table is accurate. In some embodiments, the baseline table database 150 can correct the baseline table's route/item carrier pairing based on records of when item delivery entities actually worked.

The system hub 110 is in communication with the expected deliveries database 160. In some embodiments, the expected deliveries database 160 may comprise a processor, memory, databases, address and control lines, and other components similar to those described herein for the system hub 110. In other embodiments, the expected deliveries database 160 may be configured to use the processor, memory, databases, address and control lines, and other components of the system hub 110, or a combination of its own components and the system hub 110's components.

In some embodiments, the expected deliveries database 160 is configured to store information about the expected item deliveries. For example, the expected deliveries database 160 can store information on items that are expected to be delivered on a particular or specific day. Information on items that are expected to be delivered on a particular day can be received from processing equipment that tracks the items that are received by the item carrier and coordinates the delivery of those items. For example, the expected deliveries database 160 can receive a list of the items that are expected to be delivered from the United States Postal Service system that tracks packages received by the Postal Service. In some embodiments, the expected delivery database 160 can contain information about expected item deliveries for the current date, for past dates, or for future dates.

The system hub 110 is in communication with the recalculation factor database 170. In some embodiments, the recalculation factor database 170 may comprise a processor, memory, databases, address and control lines, and other components similar to those described herein for the system hub 110. In other embodiments, the recalculation factor database 170 may be configured to use the processor, memory, databases, address and control lines, and other components of the system hub 110, or a combination of its own components and the system hub 110's components.

In some embodiments, the recalculation factor database 170 contains information on factors that can affect expected delivery times. For example, the recalculation factor database 170 can contain information on how weather can affect expected delivery times. Other examples of factors that can affect expected delivery times that the recalculation factor database 170 can store information about are: actual departure time, the identification of the item carrier, whether the item carrier is delivering in a new geographic territory, how many items are being delivered, day of the week, day of the month, day of the year, and other seasonal variations. In some embodiments the recalculation factor database 170 also contains information on how the various factors impact expected delivery times. For example, the recalculation factor database 170 could associate a "snowing" factor with a 30 minute increase in delivery time, or it could have information that explains that all deliveries will take twice as long when it is snowing, so that delivery times could be adjusted accordingly.

The system hub 110 is in communication with the daily table database 180. In some embodiments, the daily table database 180 may comprise a processor, memory, databases, address and control lines, and other components similar to those described herein for the system hub 110. In other embodiments, the daily table database 180 may be configured to use the processor, memory, databases, address and control lines, and other components of the system hub 110, or a combination of its own components and the system hub 110's components.

In some embodiments, the daily table database 180 can be configured to store daily tables. Daily tables are tables that contain the expected delivery time for the actual expected deliveries for the current day as determined from the daily table by extrapolating a daily table based on the baseline table and the data contained in the expected deliveries database 160. In some embodiments, the daily table database 180 can modify the daily table based on the data contained in the recalculation factor database 170. For example, the daily table could be generated by matching the items to be delivered on that day to the closest equivalent baseline table, modifying the expected delivery times from the baseline table based on the factors contained in the recalculation factor database 170, and then storing the values in the daily table.

The system hub 110 is in communication with the communication module 190. In some embodiments, the communication module 190 may comprise a processor, memory, databases, address and control lines, and other components similar to those described herein for the system hub 110. In other embodiments, the communication module 190 may be configured to use the processor, memory, databases, address and control lines, and other components of the system hub 110, or a combination of its own components and the system hub 110's components.

In some embodiments, the communication module 190 is configured to send information about the expected delivery window to the intended recipient of the item. In some embodiments, the communication module 190 communicates with the intended recipient of an item or items via mail, email, text message, automated phone call, or some combination of any of these options. In some embodiments, the communication module 190 automatically communicates with the intended recipient upon receipt of a command or instruction from the system hub 110, or any other component in communication therewith. For example, the communication module 190 can send the intended recipient an email or a text message that contains a one hour expected delivery window. In some embodiments, the communication module 190 is configured to send additional information about the expected delivery window to the intended recipient if the expected delivery window changes. For example, the communication module 190 can send a new email or text message with an updated or revised expected delivery window if the expected delivery window changes. In some embodiments, the communication module 190 communicates the expected delivery window to a user interface (not shown) which is accessible to an intended recipient for an item. The user interface can be an application running on a recipient's computer, smartphone, tablet computer, portable computing device, or other electronic device. For example, a recipient can access the user interface using an identification number provided in an email or text message, can click on a link in an email from the communication module 190, or can receive an alert on a mobile computing device to access an application for delivery status update.

In some embodiments, the user interface can also be used by the item receiver to record the geospatial coordinates of the desired delivery location and send that location to the expected delivery system 100. For example the user interface could be an application on a mobile phone or other mobile computing device capable of recording geospatial coordinates. The item receiver or potential item receiver can then use the mobile phone to record the geospatial coordinates at the location that they desire to receive items at. For example, the item receiver 210 can use the user interface to record the geospatial coordinates of their mailbox, porch or driveway. The user interface can then send these geospatial coordinates to the expected delivery window generation system 100 to use as the coordinates for the delivery point. In some embodiments, the user interface can automatically record and send geospatial coordinates when a mailbox or other item receptacle is installed. For example, if the mailbox is a Bluetooth or Wi-Fi enable mailbox as described in U.S. patent application Ser. No. 15/466,475, filed on Mar. 22, 2017, then the location of mobile device that is paired with the mailbox during setup can automatically be recorded and sent as the geospatial coordinates of the mailbox.

In some embodiments, the user can record the geospatial coordinates multiple times, on multiple times, and possibly at different times of day, so that the average of all of these recorded coordinates can be used as the coordinates for the delivery point. In some embodiments, the user interface can also allow item receiver 210 to record multiple delivery points used for different functions. For example, the user interface could allow the recording of the coordinates for the mailbox and designate those coordinates as the point to receive mail while also allowing the item receiver to record the coordinates of the porch and designate those coordinates as the point to receive packages.

In some embodiments, the item receivers 210, such as owners of mailboxes, houses, residents at delivery points, businesses, and the like, can be incentivized to record and submit the geospatial coordinates of the desired delivery point. The incentive can take the form of a requirement for the item receiver 210 to record and transmit the geospatial coordinates of the desired delivery point before the system 100 will provide estimated delivery times for deliveries to the deliver point. In some embodiments, the item receivers 210 can receive discounts on charges for receiving items or receive smaller or more accurate expected delivery windows in exchange for recording and sending the geospatial coordinates of the delivery point.

In some embodiments, the communication module 190 is also configured to receive communications from item receivers about the item receiver's preferences for receiving an item. For example, item receiver can send preferences such as that they prefer morning or afternoon deliveries or what time that they prefer the delivery. In some embodiments item receivers can send their preferences to the communication module via mail, email, text message, automated phone call, or some combination of any of these options. In some embodiments, item receivers can use the same user interface that they use to receive communications to also send communications. In some embodiments, the communication module can communicate these preferences to other parts of the expected delivery window generation system 100 such as the item carrier database 120 or the item carrier database 160. As discussed briefly above, in some embodiments the item carrier database 120 can create generate routes based on these user preferences and then use sorter 121 to sort items to the appropriate carrier for delivery on the route.

In some embodiments, communication module 190 is also configured to communicate with item carriers. In some embodiments communication module 190 can communicate with the item carriers via mail, email, text message, automated phone call, a custom user interface, or some combination of any of these options. In some embodiments, communication module 190 can be used to communicate route changes to the item carriers when they are out on delivery. For example, it the item carrier database 120 generates alternate routes as discussed above, communication module 190 can be used to communicate the alternate routes to the item carriers.

In some embodiments, the system hub 110 is in communication with a geofence database 195. In some embodiments, the geofence database 195 may comprise a processor, memory, databases, address and control lines, and other components similar to those described herein for the system hub 110. In other embodiments, geofence database 195 may be configured to use the processor, memory, databases, address and control lines, and other components of the system hub 110, or a combination of its own components and the system hub 110's components.

Geofence database 195 can store the various sets of geodetic coordinates that form a fence around areas associated with an address, delivery point or other locations. In some embodiments, confidence even record 220 can send the current location of the mobile device to the geofence database 121 and then receive back what address delivery point or other location that the confidence even record 220 is currently at or is approaching. In some embodiments, confidence even record 220 can periodically send its location to the geofence database 195 and the geofence database 195 will periodically send what address, delivery point or other location that the confidence even record 220 is currently at or is approaching. In some embodiments, the confidence even record 220 can record its location every second and then send a package of the locations to the geofence database 195 every 1 minute or 5 minutes. In some embodiment, the geofence database 195 can use the entire package of geodetic coordinates to determine a mobile device 110's location. In some embodiments, the geofence database 195 will actually transmit some amount of the various sets of geodetic coordinates to confidence even record 220 so that confidence even record 220 can itself determine what address, delivery point or other location that the mobile device 110 is currently at or is approaching. For example, the geofence database 195 could transmit the sets of geodetic coordinates associated with every delivery point along the route of the item deliverer who will be using confidence event record 220.

In some embodiments, the geofences can be algorithmically defined based on what the geofence is enclosing. For example, if the geofence is designating a delivery point at a house, the algorithm may take as input the geodetic coordinates for the delivery point and calculate a geofence of 10 or 20 meters surrounding the point. If the geofence is designating a delivery point at an apartment building the algorithm could calculate a geofence of 30 or 40 meters surrounding the point. If the geofence is designating location with a delivery condition such as a slippery surface, the geofence could be 5 meters surrounding the geodetic coordinate of the slippery surface.

In some embodiments, custom geofences can be individually added to the geofence database 195. For example, a user could designate a geofence that precisely follows the property line of a house or that is two meters north of a location, three meters west, 3 meters, east and 4 meters south. In some embodiments, confidence even record 220 can be used to add custom geofences to the geofence database 195. In other embodiments, geofence database 195 could be connected to a personal computer or other terminal and that terminal could be used to add custom geofences to the database. For example, a supervisor of the item delivers using the mobile devices could receive a list of delivery conditions such as slippery surfaces and the associated locations from each item deliverer and create a custom geofence for each delivery condition.

In some embodiments, the geofence database can store the geo-coordinate database discussed above. In some embodiments, the geofence database 195 can interact with confidence event recorders 220 in the same manner as discussed in U.S. Patent Application No. 62/568,098, filed on Oct. 4, 2017 hereby incorporated in its entirety by reference.

FIG. 2 is an example of an expected delivery window generation network 200. In this example, the expected delivery window generation system 100, of which only some components are displayed in FIG. 2, is in communication with an item receiver 210 and the confidence event recorders 220a-220c. In some embodiments, the expected delivery window generation system 100 can be in communication with any number of item receivers and confidence event recorders.

In some embodiments, an item receiver 210 represents the entity that expects an item to be delivered. For example, the item receiver 210 can be a person or a physical address, such as for a residence or a business. As explained above, communication module 190 can communicate the expected delivery window to item receiver 210 and receiver preferences from item receiver 210.

In some embodiments, item carrier 211 represents the entity that is delivering an item to an item receiver. An item carrier could be a delivery person or persons on a truck, bicycle, plane, helicopter, scooter, Segway®, on foot, or on another mode of transportation. In some embodiments, an item carrier could be an autonomous vehicle such as a drone or a wheeled autonomous robot. As explained above, communication module 190 can communicate changes in routes or other delivery information to item carrier 211. The delivery information can comprise any information regarding the delivery such as item identification, delivery windows, estimated arrival time, carrier location, and the like. As will be explained herein below, the delivery information can be based on the confidence data gathered as described herein.

In some embodiments, the expected delivery window generation system 100 is also in communication with confidence event recorders 220a-220c. The confidence event recorders 220a-220c can be specialized mobile computing devices with location detection capability, such as GPS, AGPS, Wi-Fi positioning, multilateration, etc. In some embodiments, the confidence event recorders 220a-220c can be tablet computers, smartphones, mobile delivery devices, and the like. The confidence event recorders 220a-220c can incorporate a scanning capability, such as a laser-type barcode scanner, an optical camera, or other type of sensor to detect and decode computer readable codes. In some embodiments, confidence event recorders 220a-220c communicate with expected delivery window generation system 100 through confidence source data handler 130. In some embodiments, the confidence event recorders 220a-220c may communicate via cellular networks, WLAN networks, or any other wireless network. In some embodiments, confidence event recorders 220a-220c can be any number of confidence event recorders.

In some embodiments, confidence event recorders 220a-220c can be configured to record and send confidence data as described previously. In some embodiments, confidence event recorders 220a-220c can be carried by item delivery entities when delivering items. In some embodiments, the confidence event recorders 220a-220c can communicate with geofence database as described previously. The item delivery entities can use the confidence event recorders 220a-220c to record confidence data.

FIG. 3 is a block diagram illustrating one embodiment of a confidence event recorder subsystem 220a. The confidence event recorder subsystem 220a comprises a confidence event recorder system hub 310, confidence activity identifier 320, clock module 330, GPS module 340, and confidence data communication module 350.

The confidence event recorder system hub 310 may comprise or be a component of a processing system implemented with one or more processors. The confidence event recorder system hub 310 may be a network of interconnected processors housed on one or more terminals. The one or more processors may be implemented with any combination of general-purpose microprocessors, microcontrollers, digital signal processors (DSPs), field programmable gate arrays (FPGAs), programmable logic devices (PLDs), controllers, state machines, gated logic, discrete hardware components, dedicated hardware finite state machines, or any other suitable entities that may perform calculations or other manipulations of information. The confidence event recorder system hub 310 may comprise a processor 311 such as, for example, a microprocessor, such as a Pentium® processor, a Pentium® Pro processor, a 8051 processor, a MIPS® processor, a Power PC® processor, an Alpha® processor, a microcontroller, an Intel CORE i7®, i5®, or i3® processor, an AMD Phenom®, A-series®, or FX® processor, or the like. The processor 311 typically has conventional address lines, conventional data lines, and one or more conventional control lines. The processor 311 may be in communication with a memory 312, which may include, for example, RAM memory, flash memory, ROM memory, EPROM memory, EEPROM memory, registers, hard disk, a removable disk, a CD-ROM, or any other form of storage medium known in the art. The memory 312 may include, for example, software, at least one software module, instructions, steps of an algorithm, or any other information. In some embodiments, the processor 311 performs processes in accordance with instructions stored in the memory 312. These processes may include, for example, controlling features and/or components of the confidence event recorder subsystem 220a, and controlling access to and from, and transmitting information and data to and from the confidence event recorder system hub 310 and the constituent components of the confidence event recorder subsystem 220a, as will be described herein.

The confidence event recorder system hub 310 comprises a memory 313, configured to store information, such as time records, location records, item identification records or the like. The memory 313 may comprise a database, a comma delimited file, a text file, or the like. The confidence event recorder system hub 310 is configured to coordinate and direct the activities of the components of the confidence event recorder subsystem 220a, and to coordinate the recording of confidence data associated with specific confidence activities.

The confidence event recorder system hub 310 is in communication with the confidence activity identifier 320. In some embodiments, the confidence activity identifier 320 may comprise a processor, memory, databases, address and control lines, and other components similar to those described herein for the confidence event recorder system hub 310. In other embodiments, the confidence activity identifier 320 may be configured to use the processor, memory, databases, address and control lines, and other components of confidence event recorder system hub 310, or a combination of its own components and the confidence event recorder system hub 310's components.

In some embodiments, confidence activity identifier 320 is used to identify that a confidence activity occurred. A confidence activity is an activity performed by an item carrier that provides a high level of confidence that the time and location of the record reflect the actual time and location of the activity. In some embodiments, the confidence activity identifier 320 is a bar code scanner. In some embodiments, the confidence activity identifier 320 identifies a confidence activity by scanning a bar code at a location where a confidence activity occurred. For example, the confidence activity identifier 320 can scan a barcode on a package that is being delivered, or the confidence activity identifier 320 can scan a barcode on the item delivery receptacle that the item is being delivered to. In some embodiments, the confidence activity identifier 320 sends a signal to the confidence event recorder system hub 310 when a confidence activity has been recorded. This signal can then be read by other components of the confidence event recorder subsystem 220a.

The confidence event recorder system hub 310 is in communication with the clock module 330. In some embodiments, the clock module 330 may comprise a processor, memory, databases, address and control lines, and other components similar to those described herein for the confidence event recorder system hub 310. In other embodiments, the clock module 330 may be configured to use the processor, memory, databases, address and control lines, and other components of confidence event recorder system hub 310, or a combination of its own components and the confidence event recorder system hub 310's components.

In some embodiments the clock module 330 is used to accurately record the time at which a confidence activity occurred. In some embodiments, clock module 330 records the time when it receives the signal that a confidence activity occurred from the confidence event recorder system hub 310, which received it from confidence activity identifier 320. In some embodiments, the clock module 330 periodically records the time in order to generate "breadcrumb" data. "Breadcrumb data" is data generated via periodic polling, creating a "breadcrumb" trail of data. In some embodiments, the clock module 330 keeps an accurate understanding of the current local time. In some embodiments, the clock module 330 can be linked to another clock, such as a clock on a central server, such that the clock module 330 reflects the time on the central clock. In some embodiments, the clock module 330 in each of the confidence event recorder subsystems 220a can be linked to the same clock. In some embodiments, the clock module 330 is linked to clocks in GPS satellites.

In some embodiments, the confidence event recorder system hub 310 is in communication with the GPS (Global Positioning System) module 340. In some embodiments, the GPS module 340 may comprise a processor, memory, databases, address and control lines, and other components similar to those described herein for the confidence event recorder system hub 310. In other embodiments, the GPS module 340 may be configured to use the processor, memory, databases, address and control lines, and other components of confidence event recorder system hub 310, or a combination of its own components and the confidence event recorder system hub 310's components.

In some embodiments, the GPS module 340 is in communication with GPS satellites and can discover the specific location of one or more confidence event recorders 220a-220c through its communications with the GPS satellites. In some embodiments the GPS module 340 uses other position determining systems to determine its exact location, such as GLONASS, COMPASS, multilateration, Wi-Fi detection, triangulation, or LORAN. In some embodiments, the GPS module 340 records the location of the confidence event recorder 220a-c whenever a confidence activity occurs. In some embodiments, the GPS module 340 records the location periodically, such as at a defined time interval, in order to generate "breadcrumb" data.

In some embodiments, the confidence event recorder system hub 310 is in communication with the confidence data communication module 350. In some embodiments, the confidence data communication module 350 may comprise a processor, memory, databases, address and control lines, and other components similar to those described herein for the confidence event recorder system hub 310. In other embodiments, the confidence data communication module 350 may be configured to use the processor, memory, databases, address and control lines, and other components of confidence event recorder system hub 310, or a combination of its own components and the confidence event recorder system hub 310's components.

In some embodiments, the confidence event recorder subsystem 220a communicates with the expected delivery window generation system 100 through confidence data communication module 350. In some embodiments, the confidence data communication module 350 may communicate via cellular networks, WLAN networks, or any other wireless or wired network. In some embodiments, confidence data communication module 350 communicates confidence data recorded by the GPS module 340, confidence activity identifier 320 and clock module 330. In some embodiments, the confidence data communication module 350 communicates the confidence data to the confidence source data handler 130.

FIG. 4 shows a process 400 for using the expected delivery window generation system 100 in conjunction with the confidence event recorder subsystem 220a to generate and communicate the expected delivery window. FIG. 4 provides a high-level overview of an embodiment of the process. More details on various process steps are shown in the subsequent figures.

The process 400 starts at a process block 401. In the process block 401, the expected delivery window generation system 100, in conjunction with the confidence event recorder subsystem 220a, create a confidence record. The confidence record contains the confidence data obtained by the confidence event recorder subsystem 220a and subsequently stored expected delivery window generation system 100. The details of one embodiment of generating the confidence record are further explained in FIG. 5 and the associated description. The process then proceeds to a process block 402.

In the process block 402, the expected delivery window generation system 100 creates a baseline table that contains a baseline estimate of the expected delivery windows. The baseline table can be created based on the confidence record. The details of one embodiment of creating the baseline table are further explained in FIG. 6 and the associated description. The process then proceeds to a process block 403.

In the process block 403, the expected delivery window generation system 100 creates a daily table that contains an estimate of the expected delivery windows for items to be delivered for that day. The daily table can be created based on the baseline table and recalculation factors such as those stored in recalculation factor database 170. The process then proceeds to a process block 404, where an item is delivered and the expected delivery window generation system 100 updates the daily table. The details of one embodiment of creating the daily table and updating the table are further explained in FIG. 7 and the associated description. The process then proceeds to a decision block 405.

In the decision block 405, the expected delivery window generation system 100 determines if all the items for the day have been delivered. In some embodiments, the expected delivery window generation system 100 determines if all of the items have been delivered by consulting the expected deliveries database 160 and determining if the record of the expected deliveries for that day matches the items actually delivered. If all of the items have not been delivered, the process then returns to the process block 404. If the items have all been delivered, the process then proceeds to a process block 406, where the process 400 ends.

FIG. 5 shows a process 500 for using the expected delivery window generation system 100 in conjunction with the confidence event recorder subsystem 220a to generate a confidence record. The process 500 starts at a process block 501.

In the process block 501, the confidence event recorder subsystem 220a identifies a confidence activity which occurs using one or more confidence event recorders 220a-c. For example, the confidence event recorder subsystem 220a can use the confidence activity identifier 320 to scan a computer readable code on an item being delivered or on a delivery receptacle where an item is delivered. The confidence activity identifier 320 could scan a computer readable code on a central mailbox, or could scan a computer readable code on a package or on normal mail delivered to a person's mailbox. In some embodiments the confidence activity identifier 320 could identify that a confidence activity occurred in response to a prompt sent to the confidence event recorder subsystem 220a. In some embodiments, the confidence activity identifier 320 may send a signal to the other components within the confidence event recorder subsystem 220a to designate that a confidence activity has occurred. The process then proceeds to a process block 502.

In the process block 502, the confidence event recorder subsystem 220a records the time and place that the confidence activity occurred. For example, the confidence event recorder subsystem 220a can use the GPS module 340 to determine the physical location of an item when that item's computer readable code was scanned and then store that location. In some embodiments, the location is stored as a pair of x, y coordinates using longitude and latitude. The clock module 330 can similarly record the time that an item's barcode was scanned. In some embodiments the GPS module 340 and the clock module 330 can record the time and location that they receive a signal from the confidence activity identifier 320 that designates that a confidence activity occurred. The process then proceeds to a process block 503.

In the process block 503, the confidence data communication module 350 transmits the location and time that a confidence activity was performed to the confidence source data handler 130. The confidence event recorder subsystem 220a can also transmit an identification of the type of confidence activity which occurred. In some embodiments, the confidence data communication module 350 sends the data to the confidence source data handler 130 via a cellular or wireless network. As an example, the confidence data communication module 350 can transmit data indicative of the computer readable code on the item or delivery receptacle that was scanned and the location and time it was scanned. The process then proceeds to a decision block 504.

In the decision block 504, the expected delivery window generation system 100 determines if the confidence activity record it just received is consistent with previously identified and recorded confidence activities. In some embodiments, the expected delivery window generation system 100 uses the confidence source data handler 130 to accomplish this. For example, the confidence source data handler 130 can determine the address of where the item was supposed to be delivered by querying the data in the expected deliveries database 160. The confidence source data handler 130 can then query the confidence record database 140 to determine whether the location data of other confidence activities that are associated with a given delivery point, such as an address, delivery receptacle, or recipient, are consistent with the location data for the just received confidence activity. For example, the confidence source data handler 130 can determine the mean or median location of the last 180 days of location data for a particular address, and determine if the location data it just received is within some distance of that mean or median, such as 10 feet, 20 feet, or any other desired distance. A similar evaluation of time data for a just-received confidence activity can be performed to evaluate whether the time of the just received confidence activity is consistent with the recorded times of previously recorded confidence activities for a given delivery point or address. If the location is not consistent with the previous data, the process proceeds to a process block 505. If the location is consistent, the process proceeds to a process block 506.

In the process block 505, the expected delivery window generation system 100 sets an error flag for the confidence activity record it just received. The error flag designates that the confidence activity record does not correspond to previous records for the same address. In some embodiments, the expected delivery window generation system 100 uses the confidence source data handler 130 to set the error flag. The process then proceeds to the process block 506.

In the process block 506, the expected delivery window generation system 100 stores the recently received confidence activity record. In some embodiments, the expected delivery window generation system 100 stores the data using the confidence record database 140. The process then proceeds to a process block 507.

In the process block 507, the expected delivery window generation system 100 associates the recently stored confidence activity record with a specific item carrier. In some embodiments, the expected delivery window generation system 100 uses the confidence record database 140 to look up which item carrier delivered the item in the item carrier database 120. For example, the confidence record database 140 can use the computer readable code of the item that was scanned to look up which item carrier was carrying the item. The confidence record database 140 can then associate the confidence activity record with that item carrier. In some embodiments, the delivery entities log in to the confidence event recorder 220a by scanning an ID bag, by inputting unique login credentials, or by other desired method. The confidence event recorder 220a then associates the identity of the item carrier with each confidence activity identified by the confidence event recorder 220a before transmitting the data to the expected delivery window generation system 100. In some embodiments, the expected delivery window generation system 100 can also associate the recently stored confidence activity record with the route that the item carrier was delivering items on and/or the time that the item carrier started delivering items. The process then ends. It is to be understood that this process can be repeated as many times as items are delivered. It is also to be understood that this process can continue to be repeated even when other steps of other processes, such as the steps in the process blocks 402, 403, 404, 406, and decision block 405 of the process 400 are ongoing.

FIG. 6 shows a process 600 for using the expected delivery window generation system 100 to generate a baseline table. The baseline table includes estimated delivery times for items to be delivered to addresses and delivery points in one or more routes within a given geographic area, such as a post office or ZIP code. The process 600 starts at a process block 601.

In the process block 601, the expected delivery window generation system 100 populates the baseline table with the item carriers for the deliveries expected for a given time period. In some embodiments, the expected delivery window generation system 100 uses the baseline table database 150 to populate the baseline table with the item carriers. For example, the baseline table database 150 can consult the expected deliveries database 160 to determine the deliveries that are scheduled to occur for a given time period, such as for a given day or for a given week. The baseline table database 150 can then consult the item carrier database 120 to determine which item carrier will be delivering the items. The baseline table database 150 can then populate the baseline table. The process then proceeds to a process block 602.

In process block 602, expected delivery window generation system 100 populates the baseline table with the delivery route for each item carrier for a desired time period, such as for the next delivery day, or for each day of the week. In some embodiments, the expected delivery window generation system 100 uses the baseline table database 150 to populate the baseline table with the delivery routes. The delivery route is the list of addresses that the item carrier will deliver items to, in the order that the item carrier will deliver them in. For example, the baseline table database 150 can consult the expected deliveries database 160 to determine the delivery route for each item carrier for each day of the week. The baseline table database 150 generates and stores a pairing of each route to each item carrier, and associates the items to be delivered along each route by each item carrier. The process then proceeds to a process block 603.

In the process block 603, the expected delivery window generation system 100 assigns an average start time to each carrier/route pairing in the baseline table. In some embodiments, the expected delivery window generation system 100 uses the baseline table database 150 to assign the average start time. For example, the baseline table database 150 can consult the item carrier database 120 to determine the average start time, based on stored previous start times, for each carrier and then assign that average start time to each item carrier/route pair. The process then proceeds to a process block 604.

In the process block 604, the expected delivery window generation system 100 creates and assigns expected delivery times to each delivery in each carrier/route pair based on past confidence activities. In some embodiments, the expected delivery window generation system 100 uses the baseline table database 150 to populate the baseline table with the expected delivery times. For example, the baseline table database 150 can consult the confidence record database 140 to review various confidence activity records. Using the confidence records, the baseline table database 150 determines when deliveries are usually made for the delivery points or addresses along a given route, and determines the time it takes to travel to and deliver items at each address for each item carrier/route pairing. The baseline table database 150 can estimate the expected delivery time based on the recorded location and the various confidence activities that have occurred at each of the addresses. The baseline table database 150 can then generate expected delivery times for each delivery based on the estimated time. To illustrate, the confidence records are used to establish an estimated delivery time for each item and/or each address for each carrier/route pairing. For example, the confidence activity records include times a particular item carrier delivers items to a particular location. The baseline table database 150 gathers these historical records, and generates an average time that a particular item carrier or carrier delivers items to a particular address. This average time is set as the estimated delivery time in the baseline table. The baseline table database 150 may generate the average delivery time using a rolling average, such as the average for the last 180 days, or may use a historical average, such as using data for the same time period in a previous year, or for the same day of the week as in the last 10 weeks. In another example, the estimated delivery times can be determined based on the actual delivery times derived from the data stored in the confidence record database 140 for a route/item carrier pairing that is the same or similar to the route/item carrier pairing that the baseline table database is calculating estimated delivery time for. In another example, the estimated delivery times can be calculated based on the average of the actual delivery times from the same or similar route/item carrier pairings. This average can similarly be a rolling average, such as the average for the last 180 days, or may use a historical average, such as using data for the same time period in a previous year, or for the same day of the week as in the last 10 weeks.

In the case that the confidence record database 140 does not include a confidence record for a particular address or delivery point along a route, the baseline table database 150 interpolates or extrapolates the average time of delivery to a particular address or delivery point by determining how many addresses or delivery points exist along a route between the addresses or delivery points for which a confidence activity exists, and diving the time between the confidence activities by the number of addresses or delivery points. In some embodiments the baseline table database can also determine an average delivery time based upon breadcrumb data at or near the address or delivery point. For example, if breadcrumb data shows that the item carrier passed through a location immediately before and immediately after a delivery point, the baseline table can determine that the time of delivery was the average of the time the item carrier arrived immediately before and immediately after the delivery point. The process then proceeds to a decision block 605.

In the decision block 605, the expected delivery window generation system 100 determines whether the item carrier/route pairs match employee time sheets. In some embodiments, the expected delivery window generation system 100 uses the baseline table database 150 make this determination. For example, the baseline table database 150 can consult the employee time sheets stored in the item carrier database 120. The baseline table database 150 can then determine whether each individual item carrier's time sheet matches with the routes assigned to that item carrier. If the time sheets do match, the process proceeds to a process block 606. Otherwise the process proceeds to a process block 607.

In the process block 606, the expected delivery window generation system 100 finalizes the baseline table. In some embodiments, the expected delivery window generation system 100 uses the baseline table database 150 to finalize the baseline table.

In the process block 607, the expected delivery window generation system 100 sets error flags on the incorrect item carrier/route pairings. In some embodiments, the expected delivery window generation system 100 uses the baseline table database 150 to set the error flags. For example, the baseline table database 150 can set an error flag on an item carrier/route pairing for a Monday when that item carrier's timesheet shows that the item carrier does not work on that day or that the item carrier no longer works at all. In another example, the baseline table database 150 can set an error flag on an item carrier/route pairing where the timesheet reveals that the item carrier's route has changed. The process then proceeds to a process block 608.

In the process block 608, the expected delivery window generation system 100 corrects the item carrier/route pairs in entries in the baseline table where error flags are set. In some embodiments, the expected delivery window generation system 100 uses the baseline table database 150 to correct the item carrier entries. For example, the baseline table database 150 can correct the item carrier for an item carrier/route pair when the item carrier normally assigned to a particular route is unavailable or will not deliver items on that route on a given day. The baseline table database 150 can determine the correct item carrier for that route by consulting the item carrier database 120. The baseline table database 150 can also correct the route for an error flagged item carrier/route pair using similar methods. The process then proceeds to a process block 609.

In the process block 609, the expected delivery window generation system 100 corrects the average start time for each carrier/route pairing with an error flag in the baseline table. In some embodiments, the expected delivery window generation system 100 uses the baseline table database 150 to correct the average start time. For example, the baseline table database 150 can consult the item carrier database 120 to determine the average start time for the corrected item carrier/route pair and then assign that new average start time to the item carrier/route pair. The process then proceeds to a process block 610.

In the process block 610, the expected delivery window generation system 100 corrects the expected delivery times for the item carrier/route pairs with error flags. In some embodiments, the expected delivery window generation system 100 uses the baseline table database 150 to correct the expected delivery times for the item carrier/route pairs with error flags. The baseline table can accomplish this in a similar manner to the process of creating the expected delivery times for carrier/route pairs used in the process block 604, except that the expected delivery times are only created for the item carrier/route pairs having error flags that are set on them. For example, the baseline table can create expected delivery times for the item carrier/route based on the confidence activities associated with the new item carrier, instead of the old item carrier. If there are no confidence activities associated with the new item carrier, the baseline table database can use the estimated delivery times from the old item carrier, but then modify the times to account for the fact that the new item carrier may be inexperienced with the new route. For example, the baseline table can add one minute to the old expected delivery times to generate the new expected delivery times. The process then returns to the decision block 605.

It is to be understood that this process can be repeated as many times as items are delivered. It is also to be understood that this process can continue to be repeated even when other steps of other processes, such as the steps in the process blocks 401, 403, 404, 406, and decision block 405 of the process 400 are ongoing.

FIG. 7 shows a process 700 for using the expected delivery window generation system 100 to generate and update a daily table. The process 700 starts at a process block 701.

In the process block 700, the expected delivery window generation system 100 receives the baseline table to use as an input to generate the daily table. In some embodiments, the expected delivery window generation system 100 uses the daily table database 180 to accomplish this function. For example, the daily table database 180 can query the baseline table database 150 and the baseline table database 150 can send the current version of the baseline table in response. The daily table database 180 can then create the initial version of the daily table based on the entries in the baseline table database 150 for the current day. The process then proceeds to a process block 702.

In the process block 702, the expected delivery window generation system 100 replaces the average start times for the item delivery entities uploaded into the daily table from the baseline table with the actual start time of the item delivery entities. In some embodiments, the expected delivery window generation system 100 can use the daily table database 180 to replace the start times. For example, the daily table database 180 can requisition the actual start times from item carrier database 120 based on the entry on an item carrier's time sheet from when they clocked in. The process then proceeds to a process block 703.

In the process block 703, the expected delivery window generation system 100 generates the expected delivery times for the baseline table. In some embodiments, the expected delivery window generation system 100 uses the daily table database 180 to generate the expected delivery times. For example, the daily table database 180 can change the expected delivery time inputted into the daily table from the baseline table by the amount of time that the actual start time of each item carrier differs from the original average start time. As an illustration, if the actual start time was five minutes later than the average start time, the daily table database 180 can adjust the expected delivery times to be 5 minutes later than the original expected delivery time. The process then proceeds to a decision block 704.

In the decision block 704, the expected delivery window generation system 100 determines if additional modifiers are present that could alter the expected delivery times. In some embodiments, the expected delivery window generation system 100 uses the daily table database 180 to determine if additional modifiers are present. For example, the daily table database 180 can query the recalculation factor database 170 to determine what additional modifiers are present. The recalculation factor database 170 can then return the modifiers and the associated amount of the time that the expected delivery times need to be adjusted. As an illustration, the recalculation factor database 170 can send back the "snowing" modifier and the accompanying amount of time that the expected delivery time needs to be adjusted because it is snowing. The recalculation factor database 170 can also send modifiers based on departure time, the identification of the item carrier, whether the item carrier is delivering in a new geographic territory, how many items are being delivered, and the time of year. In some embodiments, the recalculation factor database can determine the correct modifiers through historical data or through expert estimates. If modifiers are present, then the process proceeds to a process block 705, otherwise the process proceeds to a process block 706.

In the process block 705, the expected delivery window generation system 100 modifies the expected delivery times based on the modifiers it discovered in the decision block 704. In some embodiments, the expected delivery window generation system 100 uses the daily table database 180 to modify the expected delivery times. For example, if the daily table database 180 received the "snowing" modifier from the recalculation factor database 170, it could add 30 minutes to each expected delivery time. The process then proceeds to the process block 706.

In the process block 706, the expected delivery window generation system 100 communicates expected delivery windows to the item receiver 210. The expected delivery window is a window of time based on the expected delivery time. For example, the expected delivery window for an item with an expected delivery time of 1:30 PM could be 1:00-2:00 PM. In some embodiments, the expected delivery window generation system 100 can use the communication module 190 to communicate the expected delivery window to the item recipient. For example the communication module 190 can communicate with the item receiver 210 via mail, email, text message, automated phone call, or some combination of any of these options. For example, the communication module 190 can send the item receiver 210 an email or a text message that contains a one hour expected delivery window for when there item will be delivered in. In some embodiments, the communication module only communicates the expected delivery window if the expected delivery window has changed from a previously sent expected delivery window. The process then proceeds to a process block 707.

In the process block 707, the expected delivery window generation system 100, in conjunction with the confidence event recorder subsystem 220*a*, records the actual delivery of an item, including the time that the item was delivered. In some embodiments, the expected delivery window generation system 100 uses the daily table database 180 to record that a delivery has occurred. In some embodiments, the daily table database 180 receives the information from the confidence data communication module 350 through the confidence source data handler 130. In some embodiments, the confidence source data handler 130 notifies the daily table database 180 that a delivery has occurred, including the time it occurred, every time it receives confidence data from the confidence event recorder subsystem 220*a*. Thus, in some embodiments, the daily table database 180 does not record the delivery of every item that was scheduled to be delivered for the day, but only the deliveries that were recorded as confidence activities. The process then proceeds to a process block 708.

In the process block 708, the expected delivery window generation system 100 updates the expected delivery times based on the time that the actual delivery of an item occurred. In some embodiments, the expected delivery window generation system 100 uses the daily table database 180 to update expected delivery times. For example, the daily table database 180 can compare the expected delivery time to the actual delivery time of an item and adjust the times of all future deliveries expected for the day based on the difference. For instance, if the actual delivery time was 5 minutes earlier than the expected delivery time, the daily table database 180 could adjust all future expected delivery times to be 5 minutes earlier. The process then proceeds to a process block 709.

In the process block 709, the expected delivery window generation system 100 determines if the expected delivery windows communicated to the item receiver 210 are still accurate. In some embodiments, the expected delivery window generation system 100 uses the communication module 190 to make this determination. For example the communication module 190 can determine if the new expected delivery times still fall within the expected delivery windows sent to the item receiver 210. For instance, if the expected delivery window was 1:30-2:30 PM and the new expected delivery time was 1:35 PM, the new time would fall within the window. If the time was 2:35 PM, it would not. In some embodiments, the expected delivery window is an hour centered around the expected delivery time. If the expected delivery time shifts, the window can also shift, to maintain a one hour window centered around the expected delivery time. For example, if the new expected delivery time shifts 5 minutes either direction, the delivery window also shifts five minutes, to keep the expected delivery time in the middle of the expected delivery window. If the expected delivery windows are accurate, the process returns to the process block 707, otherwise the process goes to decision block 710.

In the decision block 710, the expected delivery window generation system 100 determines if the system can reroute the item carriers to improve the delivery of items. In some embodiments the system attempts reroute item carriers to maintain expected delivery windows as close as possible to already communicated delivery windows. In some embodiments, the expected delivery window generation system 100 uses the item carrier database 120 to generate theoretical new routes for the item carriers. The system can then generate theoretical expected delivery windows for the new routes using the methods described. The system 100 can then evaluate these theoretical routes to determine if rerouting the carriers is necessary. If the system determines that rerouting is necessary, the system proceeds to a process block 711. Otherwise, the system returns to the process block 706.

In the process block 711, the expected delivery system 100 reroutes carriers. In some embodiments, the expected delivery window generation system 100 uses the item carrier database 120 to generate the new routes for the item carriers. In some embodiments, the system 100 uses the communication module 190 to communicate these new routes to the item carrier. As discussed previously, the new routes can be communicated via mail, email, text message, automated phone call, or some combination of any of these options. The process then returns to the process block 701.

FIG. 8 is a flow chart depicting one embodiment of a process 800 for determining delivery time estimates for creating a baseline table. In some embodiments, this process can be used to calculate the expected delivery times used to create the baseline table as described in FIG. 6. In some embodiments, the process 800 starts with process block 801. In process block 801, a particular route is divided into groupings by baseline table database 150. In some embodiments, the route is divided into groupings by first determining the all of the delivery stops in a route. Next, the route is divided into groups of delivery stops called groupings. In some embodiments, the stops are divided into groupings based on the geographic location of all of the stops. For example, the geographically close stops can be grouped together into a single grouping. In some embodiments, stops that occur within the same building or at a single mailbox, such as high rises or multi-resident buildings, can be grouped together. In some embodiments, the groupings can be 1% groupings, where each grouping only contains up to 1% of the stops on a given route. In some embodiments, these groupings are 1% groupings. In some embodiments, a 1% grouping can include about 1% of all delivery points or stops along a route. In this way, a delivery route can be divided into groups, each group including about 1% of all the delivery points of the route. The delivery points or stops in each of the 1% groupings are generally consecutive, or in sequence along the route.

The process 800 proceeds to the process block 802, wherein a special case confidence point is determined by baseline table database 150. In some embodiments, a confidence point is a single stop within a grouping that will be used to determine an estimated delivery time for certain stops. In some embodiments, multiple confidence points can be used to determine an estimated delivery time. In some embodiments, the special case confidence point is the first stop in the first grouping along the route.

The process 800 proceeds to process block 803, wherein confidence points for the rest of the groupings are determined by the baseline table database 150. In some embodiments, the confidence point is the last delivery point or stop in for each grouping.

The process 800 proceeds to decision block 804, wherein the baseline table database determines whether any of the confidence points are large deviations from the line of travel that an item deliverer would deliver items along. If so, these confidence points are excluded from the preceding calculations in process block 805. Otherwise, the process 800 continues proceeds to process block 806. In some embodiments, the process 800 can proceed directly to process block 806 and the relevant confidence points can be excluded after process block 806 is completed.

In process block 806, each confidence point is assigned a prediction time by baseline database 150. In some embodiments, the prediction time is calculated by using an average relative time for each stop within the grouping based on the data recorded in the confidence record database. In some embodiments, the prediction time is calculated by a rolling 4 week average of all the delivery times of all the stops in the grouping. In some embodiments, the relative time is calculated as the time the delivery was made minus the time the item deliverer began the route.

The process 800 proceeds to the process block 807, wherein a prediction time is calculated for every other stop in each grouping. In some embodiments, the prediction times are calculated in order from first grouping to last grouping within the route. In some embodiments, a total travel time for each grouping is calculated by subtracting the prediction time of the confidence point for each grouping from the previous confidence point. This is then divided by the number of stops to determine the average travel time for each stop in a particular grouping. Then the prediction time can be calculated as the prediction time for the confidence point of the group minus the average time per stop multiplied by the number of stops between the confidence point and the stop the prediction time is being calculated for. For example, if the prediction time of the confidence point was 15 minutes and the average stop time for the group was one minute, the prediction time for the 5th stop out of 10 for the grouping would be 15−(4×1)=11 minutes In some embodiments, the prediction time for each stop in a group can instead be calculated by taking the prediction time for the confidence point in the proceeding grouping and adding the average stop time multiplied by the stop number for that particular group. For example, if the prediction time for the previous confidence point was 6 minutes, and the average stop time for the group was one minute, the prediction time for the 5th stop out of 10 for the group would 6+(1×5)=11 minutes.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium. Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A system for delivering an item comprising: a route database storing a route comprising a plurality of delivery points; a mobile computing device assigned to a user delivering delivery items along the route, the mobile computing device configured to scan a physical item at one or more delivery points and generate scan information and to detect the location of the user along the route; a confidence source data handler in communication with the mobile computing device the data handler configured to: receive first scan information associated with a delivery of a first item to a first one of the plurality of delivery points; receive second scan information associated with a delivery of a second item to a second one of the plurality of delivery points; a baseline table database in communication with the confidence source data handler, the baseline table database configured to create, based on the first and second scan information, a virtual confidence event associated with the delivery of a physical item at a third one of the plurality of delivery points, wherein the system further comprises: automatically transmitting to the mobile computing device a prompt to record a confidence event at the third delivery point when the mobile computing device is detected in proximity to the third delivery point.

2. The system of claim 1, wherein the third delivery point is between the first one and the second one of the plurality of delivery points along the route.

3. The system of claim 1, wherein the first and second scan information comprise the time and location where a physical item was scanned.

4. The system of claim 3, wherein the location where the physical item is scanned is determined via a geofence.

5. The system of claim 1, wherein the baseline table database is configured to create the virtual confidence event based at least in part on an estimate of when and where the delivery of an item would have occurred.

6. The system of claim 1, wherein the confidence source data handler is configured to compare the first scan information with prior scan information for the first one of the plurality of delivery points to compare the second scan information with prior scan information for the second one of the plurality of delivery points.

7. The system of claim 6, wherein the confidence source data handler is configured to reject the second scan information if the second scan information is not within a threshold time or distance as the prior scan information for the second one of the plurality of delivery points.

8. The system of claim 1, wherein the mobile delivery device is further configured to receive a carrier identifier, and wherein the confidence source data handler is configured to associate the carrier identifier with the first scan information and the second scan information.

9. The system of claim 8, wherein the baseline table database is configured to generate a baseline table for a carrier identified by the carrier identifier based on the first and second scan information and the virtual confidence event.

10. The system of claim 1, wherein the first delivery point corresponds to a first delivery address and the second delivery point corresponds to a second delivery address different from the first delivery address along the route.

11. The system of claim 1, wherein the confidence source data handler is further configured to determine, based on the received first and second scan information, that scan information for the third one of the plurality of delivery points is missing, and wherein the baseline table database is configured to create the virtual confidence event associated with the delivery of the physical item at the third one of the plurality of delivery points in response to determining that the scan information for the third one of the plurality of delivery points is missing.

12. A method for delivering an item comprising: storing, in a route database, a route comprising a plurality of delivery points; generating, with a mobile computing device assigned to a user delivering delivery items along the route, scan information associated with the scan of a physical item at one or more of the plurality of delivery points; detecting, in the mobile computing device, the location of the user along the route; receiving, at a confidence source data handler, first scan information associated with delivery of a first item to a first delivery point; receiving, at a confidence source data handler, second scan information associated with delivery of a second item to a second delivery point; creating, based on the first and second scan information, a virtual confidence event associated with the delivery of a physical item at a third delivery point; and storing, in a baseline table database in communication with the confidence source data handler, the virtual confidence event; and automatically sending a prompt to the mobile computing device to record a confidence event for the third delivery point when the mobile computing device is detected in proximity to the third delivery point.

13. The method of claim 12, wherein the third delivery point is between the first and second delivery point along the route.

14. The method of claim 12, wherein the first and second scan information comprise the time and location where a physical item was scanned.

15. The method of claim 14, wherein the location where the physical item is scanned is determined via a geofence.

16. The method of claim 12, wherein the virtual confidence event is created based at least in part on an estimate of when and where the delivery of an item would have occurred.

17. The method of claim 12, further comprising comparing the first scan information with prior scan information for the first one of the plurality of delivery points and comparing the second scan information with prior scan information for the second one of the plurality of delivery points.

18. The method of claim 17, further comprising rejecting the second scan information if the second scan information is not within a threshold time or distance as the prior scan information for the second one of the plurality of delivery points.

19. The method of claim 12, further comprising: receiving, in the mobile computing device, a carrier identifier; and associating the carrier identifier with the first scan information and the second scan information.

20. The method of claim 19, further comprising generating a baseline table for a carrier identified by the carrier identifier based on the first and second scan information and the virtual confidence event.

* * * * *